(12) United States Patent
Wallrabenstein

(10) Patent No.: US 9,946,858 B2
(45) Date of Patent: Apr. 17, 2018

(54) AUTHENTICATION SYSTEM AND DEVICE INCLUDING PHYSICAL UNCLONABLE FUNCTION AND THRESHOLD CRYPTOGRAPHY

(71) Applicant: Analog Devices, Inc., Norwood, MA (US)

(72) Inventor: John Ross Wallrabenstein, West Lafayette, IN (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 14/746,054

(22) Filed: Jun. 22, 2015

(65) Prior Publication Data
US 2016/0269186 A1  Sep. 15, 2016

Related U.S. Application Data

(63) Continuation-in-part of application No. 14/704,914, filed on May 5, 2015.
(Continued)

(51) Int. Cl.
*G06F 21/00* (2013.01)
*G06F 21/31* (2013.01)
(Continued)

(52) U.S. Cl.
CPC .............. *G06F 21/31* (2013.01); *G09C 1/00* (2013.01); *H04L 9/3278* (2013.01); *G06F 2221/2129* (2013.01); *H04L 2209/12* (2013.01)

(58) Field of Classification Search
CPC . H04L 63/0853; H04L 9/3278; H04L 9/3221; H04L 2209/34; H04L 2209/12; G09C 1/00; G06F 21/31; G06F 2221/2129
See application file for complete search history.

(56) References Cited

U.S. PATENT DOCUMENTS 6,501,390 B1  12/2002  Chainer et al.
7,564,345 B2   7/2009  Devedas et al.
(Continued)

FOREIGN PATENT DOCUMENTS

EP       2 320 344 A2    5/2011
KR    20090104421 A    10/2009
(Continued)

OTHER PUBLICATIONS

Khoshroo, "Design and Evaluation of FPGA-Based Hybrid Physically Unclonable Functions" thesis, the University of Western Ontario, 2013.*
(Continued)

*Primary Examiner* — Don Zhao
(74) *Attorney, Agent, or Firm* — Wolf, Greenfield & Sacks, P.C.

(57) ABSTRACT

An authentication system and device including physical unclonable function (PUF) and threshold cryptography comprising: a PUF device having a PUF input and a PUF output and constructed to generate, in response to the input of a challenge, an output value characteristic to the PUF and the challenge; and a processor having a processor input that is connected to the PUF output, and having a processor output connected to the PUF input, the processor configured to: control the issuance of challenges to the PUF input via the processor output, receive output from the PUF output, combine multiple received PUF output values each corresponding to a share of a private key or secret, and perform threshold cryptographic operations. The system and device may be configured so that shares are refreshable, and may be configured to perform staggered share refreshing.

20 Claims, 9 Drawing Sheets

Related U.S. Application Data

(60) Provisional application No. 62/150,586, filed on Apr. 21, 2015, provisional application No. 61/988,848, filed on May 5, 2014, provisional application No. 62/128,920, filed on Mar. 5, 2015.

(51) Int. Cl.
*G09C 1/00* (2006.01)
*H04L 9/32* (2006.01)

(56) References Cited

U.S. PATENT DOCUMENTS

| | | | |
|---|---|---|---|
| 7,581,248 B2 | 8/2009 | Atkins et al. | |
| 7,653,197 B2 | 1/2010 | Van Dijk | |
| 7,702,927 B2 | 4/2010 | Devedas et al. | |
| 7,839,278 B2 | 11/2010 | Devedas et al. | |
| 7,926,089 B2 | 4/2011 | Tulshibagwale et al. | |
| 7,962,516 B2 | 6/2011 | Bahrs et al. | |
| 8,032,760 B2 | 10/2011 | Tuyls et al. | |
| 8,281,127 B2 | 10/2012 | Hayes | |
| 8,290,150 B2 | 10/2012 | Erhart et al. | |
| 8,346,951 B2 | 1/2013 | Hayes | |
| 8,379,856 B2 | 2/2013 | Potkonjak | |
| 8,386,990 B1 | 2/2013 | Trimberger et al. | |
| 8,418,006 B1 | 4/2013 | Trimberger et al. | |
| 8,446,250 B2 | 5/2013 | Kursawe et al. | |
| 8,458,489 B2 | 6/2013 | Beckmann et al. | |
| 8,463,813 B2 | 6/2013 | Siress et al. | |
| 8,468,186 B2 | 6/2013 | Yu | |
| 8,510,608 B2 | 8/2013 | Futa et al. | |
| 8,516,269 B1 | 8/2013 | Hamlet et al. | |
| 8,525,169 B1 | 9/2013 | Edelstein et al. | |
| 8,566,579 B2 | 10/2013 | Armstrong et al. | |
| 8,577,091 B2 | 11/2013 | Ivanov et al. | |
| 8,625,788 B2 | 1/2014 | Pendakur et al. | |
| 8,667,265 B1 * | 3/2014 | Hamlet | H04L 9/0866 326/80 |
| 8,752,155 B2 | 6/2014 | Lauper | |
| 8,782,396 B2 | 7/2014 | Ziola et al. | |
| 8,844,009 B2 | 9/2014 | Walsh et al. | |
| 8,848,905 B1 | 9/2014 | Hamlet et al. | |
| 8,868,923 B1 | 10/2014 | Hamlet et al. | |
| 8,912,817 B2 | 12/2014 | Wang et al. | |
| 8,918,647 B1 | 12/2014 | Wallrabenstein | |
| 8,995,660 B2 | 3/2015 | Kobayashi et al. | |
| 9,018,972 B1 * | 4/2015 | Gurrieri | H03K 19/003 326/8 |
| 9,032,476 B2 | 5/2015 | Potkonjak | |
| 9,158,906 B2 * | 10/2015 | Guajardo Merchan et al. | |
| 9,225,512 B1 | 12/2015 | Trimberger | |
| 9,292,692 B2 | 3/2016 | Wallrabenstein | |
| 9,672,342 B2 | 6/2017 | Walsh et al. | |
| 9,705,854 B2 | 7/2017 | Khazan et al. | |
| 9,715,590 B2 | 7/2017 | Gardner et al. | |
| 2003/0081785 A1 * | 5/2003 | Boneh | H04L 9/0847 380/277 |
| 2003/0204743 A1 | 10/2003 | Devadas | |
| 2005/0149496 A1 | 7/2005 | Mukherjee et al. | |
| 2005/0222896 A1 | 10/2005 | Rhyne et al. | |
| 2006/0023887 A1 | 2/2006 | Agrawal et al. | |
| 2006/0045262 A1 | 3/2006 | Orlando | |
| 2006/0210082 A1 * | 9/2006 | Devadas et al. | 380/277 |
| 2007/0036353 A1 | 2/2007 | Reznik et al. | |
| 2007/0044139 A1 | 2/2007 | Tuyls et al. | |
| 2007/0206786 A1 | 9/2007 | Chakraborty | |
| 2008/0069341 A1 | 3/2008 | Relyea | |
| 2008/0133912 A1 | 6/2008 | Yamamoto et al. | |
| 2008/0181398 A1 | 7/2008 | Pappu | |
| 2008/0256549 A1 | 10/2008 | Liu et al. | |
| 2008/0256600 A1 | 10/2008 | Schrijen et al. | |
| 2009/0063860 A1 | 3/2009 | Barnett et al. | |
| 2009/0083833 A1 * | 3/2009 | Ziola | G06F 21/31 726/2 |
| 2010/0037056 A1 | 2/2010 | Follis et al. | |
| 2010/0122093 A1 | 5/2010 | Tuyls et al. | |
| 2010/0127822 A1 | 5/2010 | Devedas | |
| 2010/0176920 A1 | 7/2010 | Kursawe et al. | |
| 2010/0272255 A1 | 10/2010 | Devedas et al. | |
| 2010/0293384 A1 | 11/2010 | Potkonjak | |
| 2010/0293612 A1 | 11/2010 | Potkonjak | |
| 2011/0002461 A1 * | 1/2011 | Erhart | H04L 9/302 380/44 |
| 2011/0033041 A1 | 2/2011 | Yu et al. | |
| 2011/0099117 A1 | 4/2011 | Schepers et al. | |
| 2011/0113392 A1 * | 5/2011 | Chakraborty et al. | 716/102 |
| 2011/0138475 A1 | 6/2011 | Gordon et al. | |
| 2011/0191837 A1 * | 8/2011 | Guajardo Merchan | G06F 21/32 726/6 |
| 2011/0215829 A1 | 9/2011 | Guajardo Merchan et al. | |
| 2011/0299678 A1 | 12/2011 | Deas et al. | |
| 2012/0072717 A1 | 3/2012 | Hayes | |
| 2012/0072737 A1 | 3/2012 | Schrijen et al. | |
| 2012/0124385 A1 | 5/2012 | Klasen et al. | |
| 2012/0131340 A1 | 5/2012 | Teuwen et al. | |
| 2012/0137137 A1 | 5/2012 | Brickell et al. | |
| 2012/0183135 A1 | 7/2012 | Paral et al. | |
| 2012/0233674 A1 | 9/2012 | Gladstone et al. | |
| 2012/0321077 A1 | 12/2012 | Shiota et al. | |
| 2013/0046990 A1 | 2/2013 | Fahrny et al. | |
| 2013/0051552 A1 * | 2/2013 | Handschuh et al. | 380/44 |
| 2013/0094649 A1 | 4/2013 | Tomlinson et al. | |
| 2013/0114810 A1 * | 5/2013 | Kobayashi | H04L 9/0836 380/47 |
| 2013/0138710 A1 * | 5/2013 | Yamamoto et al. | 708/250 |
| 2013/0142329 A1 | 6/2013 | Bell et al. | |
| 2013/0198838 A1 | 8/2013 | Schmidt et al. | |
| 2013/0246809 A1 | 9/2013 | Beckmann et al. | |
| 2014/0093074 A1 * | 4/2014 | Gotze et al. | 380/45 |
| 2014/0108786 A1 * | 4/2014 | Kreft | G06F 21/71 713/156 |
| 2014/0140513 A1 | 5/2014 | Brightsky et al. | |
| 2014/0189890 A1 | 7/2014 | Koeberl et al. | |
| 2014/0205089 A1 * | 7/2014 | Irwin | H04L 9/0877 380/44 |
| 2014/0279532 A1 | 9/2014 | Tremlet | |
| 2015/0058928 A1 | 2/2015 | Guo et al. | |
| 2015/0071432 A1 | 3/2015 | Zhu et al. | |
| 2015/0095655 A1 | 4/2015 | Sherman | |
| 2015/0134966 A1 | 5/2015 | Wallrabenstein | |
| 2015/0143130 A1 | 5/2015 | Ducharme et al. | |
| 2015/0195088 A1 * | 7/2015 | Rostami et al. | 726/16 |
| 2015/0234751 A1 | 8/2015 | Van Der Sluis et al. | |
| 2015/0278505 A1 * | 10/2015 | Lu | H04L 9/0866 726/19 |
| 2015/0317480 A1 | 11/2015 | Gardner et al. | |
| 2015/0318994 A1 | 11/2015 | Walsh et al. | |
| 2015/0341792 A1 | 11/2015 | Walsh et al. | |
| 2016/0021096 A1 | 1/2016 | Wallrabenstein | |
| 2016/0170907 A1 | 6/2016 | Walsh et al. | |
| 2016/0261409 A1 | 9/2016 | French et al. | |
| 2016/0269186 A1 | 9/2016 | Wallrabenstein | |
| 2017/0063559 A1 | 3/2017 | Wallrabenstein et al. | |
| 2017/0149572 A1 | 5/2017 | Wallrabenstein | |

FOREIGN PATENT DOCUMENTS

| | | |
|---|---|---|
| WO | WO 2010/105993 A2 | 9/2010 |
| WO | WO 2015/200196 A1 | 12/2015 |
| WO | WO 2016/141386 A1 | 9/2016 |

OTHER PUBLICATIONS

Khoshroo,"Design and Evaluation of FPGA-Based Hybrid Physically Unclonable Functions" thesis, the University of Western Ontario, 2013. 107 pages.*

Merli et al., "Side-Channel Analysis of PUFs and Fuzzy Extractors," Trust and Trustworthy Computing, vol. 6740 of Lecture Notes in Computer Science, pp. 33-47 (Springer 2011).

Sardar et al., "Zero Knowledge Proof in Secret Sharing Scheme Using Elliptic Curve Cryptography," Global Trends in Computing

(56) References Cited

OTHER PUBLICATIONS and Communication Systems, vol. 269 of Communications in Computer and Information Science, pp. 220-226 (Springer 2012).
Kim et al., "Threshold Signature Schemes for ElGamal Variants," Computer Standards and Interfaces, 33:4, pp. 432-437 (2011).
Hua-Qun et al., "Verifiable (t, n) Threshold Signature Scheme based on Elliptic Curve," Wuhan Univ. Journal of Natural Sciences, 10:1, pp. 165-168 (2005).
Kursawe et al., "Reconfigurable Physical Unclonable Functions—Enabling technology for tamper-resistant storage," Hardware-Oriented Security and Trust, HOST '09, IEEE International Workshop, pp. 22-29 (2009).
Blakley, "Safeguarding cryptographic keys," Proceedings of the 1979 AFIPS National Computer Conference, pp. 313-317 (AFIPS Press 1979).
Karakoyunlu et al., "Differential template attacks on PUF enabled cryptographic devices," IEEE International Workshop on Information Forensics and Security (WIFS), pp. 1-6 (2010).
Merli et al., "Semi-invasive EM Attack on FPGA RO PUFs and Countermeasures," Proceedings of the Workshop on Embedded Systems Security, WESS '11, pp. 2:1-2:9 (ACM 2011).
Zheng, "Digital Signcryption or How to Achieve Cost(Signature & Encryption) << Cost(Signature)+ Cost(Encryption)," Advances in Cryptology, CRYPTO '97, vol. 1294 of Lecture Notes in Computer Science, pp. 165-179 (Springer 1997).
Zheng et al., "How to Construct Efficient Signcryption Schemes on Elliptic Curves," Inf. Process. Lett., 68:5, pp. 227-233 (1998).
Pedersen, "A Threshold Cryptosystem without a Trusted Party," Advances in Cryptology, EUROCRYPT 91, vol. 547 of Lecture Notes in Computer Science, pp. 522-526 (Springer 1991).
Tang, "ECDKG: A Distributed Key Generation Protocol Based on Elliptic Curve Discrete Logarithm," Technical Report 04-838 (Univ. of Southern California Dept. Comp. Sci. 2004).
Gennaro et al., "Secure Distributed Key Generation for Discrete-Log Based Cryptosystems," Advances in Cryptology, EUROCRYPT 99, vol. 1592 of Lecture Notes in Computer Science, pp. 295-310 (Springer 1999).
Gennaro et al., "Secure Applications of Pedersen's Distributed Key Generation Protocol," Topics in Cryptology, CT-RSA 2003, vol. 2612 of Lecture Notes in Computer Science, pp. 373-390 (Springer 2003).
Abe et al., "Adaptively Secure Feldman VSS and Applications to Universally-Composable Threshold Cryptography," Advances in Cryptology, CRYPTO 2004, vol. 3152 of Lecture Notes in Computer Science, pp. 317-334 (Springer 2004).
Jarecki et al., "Adaptively Secure Threshold Cryptography: Introducing Concurrency, Removing Erasures," Advances in Cryptology, EUROCRYPT 2000, vol. 1807 of Lecture Notes in Computer Science, pp. 221-242 (Springer 2000).
Libert et al., "Adaptively Secure Non-interactive Threshold Cryptosystems," Automata, Languages and Programming, pp. 588-600 (Springer Berlin Heidelberg 2011).
Frankel et al., "Optimal-Resilience Proactive Public-Key Cryptosystems," 38th Annual Symposium on Foundations of Computer Science, pp. 384-393 (1997).
Herzberg et al., "Proactive Public Key and Signature Systems," Proceedings of the 4th ACM Conference on Computer and Communications Security, CCS '97, pp. 100-110 (ACM 1997).
Herzberg et al., "Proactive Secret Sharing or: How to Cope With Perpetual Leakage," Advances in Cryptology, CRYPTO 95, vol. 963 of Lecture Notes in Computer Science, pp. 339-352 (Springer 1995).
Nikova et al., "Threshold Implementations Against Side-Channel Attacks and Glitches," Information and Communications Security, vol. 4307 of Lecture Notes in Computer Science, pp. 529-545 (Springer Berlin Heidelberg 2006).
Moradi et al., "Pushing the Limits: A Very Compact and a Threshold Implementation of AES," Advances in Cryptology—EUROCRYPT 2011, vol. 6632 of Lecture Notes in Computer Science, pp. 69-88 (Springer Berlin Heidelberg 2011).
Bilgin et al., "A More Efficient AES Threshold Implementation," Cryptology ePrint Archive, Report 2013/697 (2013).
Majzoobi et al., "Techniques for Design and Implementation of Secure Reconfigurable PUFs," ACM Transactions on Reconfigurable Technology Systems, 2:1, pp. 5:1-5:33 (2009).
Nabeel et al., "Authentication and key management for advanced metering infrastructures utilizing physically unclonable functions." Smart Grid Communications (SmartGridComm), IEEE Third International Conference on, pp. 324-329 (IEEE 2012).
Katzenbeisser et al., "Recyclable PUFs: logically reconfigurable PUFs," Journal of Cryptographic Engineering, 1:3, pp. 177-186 (2011).
Eichhorn et al., "Logically Reconfigurable PUFs: Memory-based Secure Key Storage," Proceedings of the Sixth ACM Workshop on Scalable Trusted Computing, STC '11, pp. 59-64 (ACM 2011).
Becker et al., "Stealthy Dopant-Level Hardware Trojans," Cryptographic Hardware and Embedded Systems—CHES 2013, vol. 8086 of Lecture Notes in Computer Science, pp. 197-214 (Springer 2013).
Rührmair et al., "Modeling Attacks on Physical Unclonable Functions," Proceedings of the 17th ACM conference on Computer and communications security, CCS '10, pp. 237-249 (ACM 2010).
Holcomb et al., "Initial SRAM State as a Fingerprint and Source of True Random Numbers For RFID Tags," In Proceedings of the Conference on RFID Security (2007).
Kumar et al., "Extended abstract: The Butterfly PUF Protecting IP on Every FPGA," IEEE International Workshop on Hardware-Oriented Security and Trust, pp. 67-70 (2008).
Lee et al., "A technique to build a secret key in integrated circuits for identification and authentication applications," IEEE Symposium on VLSI Circuits: Digest of Technical Papers, pp. 176-179 (2004).
Suh et al., "Physical Unclonable Functions for Device Authentication and Secret Key Generation," Proceedings of the 44th annual Design Automation Conference, DAC '07, pp. 9-14 (ACM 2007).
Tuyls et al., "Read-Proof Hardware from Protective Coatings," Proceedings of the 8th international conference on Cryptographic Hardware and Embedded Systems, CHES'06, pp. 369-383 (Springer 2006).
Rührmair, "Applications of High-Capacity Crossbar Memories in Cryptography," IEEE Trans. Nanotechnol. 10:3, pp. 489-498 (2011).
Juels et al., "A Fuzzy Commitment Scheme," Proceedings of the 6th ACM conference on Computer and Communications Security, CCS '99, pp. 28-36 (ACM 1999).
Dodis et al., "Fuzzy Extractors: How to Generate Strong Keys from Biometrics and Other Noisy Data," SIAM J. Comput., 38:1, pp. 97-139 (2008).
Hori et al., "Quantitative and Statistical Performance Evaluation of Arbiter Physical Unclonable Functions on FPGAs," 2010 International Conference on Reconfigurable Computing and FPGAs (ReCon-Fig), pp. 298-303 (2010).
Maiti, "A Systematic Approach to Design an Efficient Physical Unclonable Function," Ph.D. Dissertation (Virginia Tech. 2012).
Gassend et al., "Silicon Physical Random Functions," Proceedings of the 9th ACM conference on Computer and communications security, CCS '02, pp. 148-160 (ACM 2002).
Katzenbeisser et al., "PUFs: Myth, Fact or Busted? A Security Evaluation of Physically Unclonable Functions (PUFs) Cast in Silicon," Cryptographic Hardware and Embedded Systems—CHES '12, pp. 283-301 (Springer 2012).
Ravikanth, "Physical one-way functions," Ph.D. Dissertation (MIT 2001).
Ruan et al., "Elliptic curve ELGamal threshold-based key management scheme against compromise of distributed RSUs for VANETs," Journal of Information Processing 20:4 (2012) (electronic pre-print).
Pfaffhauser, "Protocols for MPC based on Unclonability," Master Thesis (ETH Zurich 2011).
Yu et al., "Recombination of Physical Unclonable Functions," GOMACTech (2010).

(56) References Cited

OTHER PUBLICATIONS

Armknecht et al., "A Formalization of the Security Features of Physical Functions," Proceedings of the 2011 IEEE Symposium on Security and Privacy, SP '11, pp. 397-412 (IEEE Computer Society 2011).
Brzuska et al., "Physically Uncloneable Functions in the Universal Composition Framework," Advances in Cryptology—CRYPTO 2011—31st Annual Cryptology Conference, vol. 6841 of Lecture Notes in Computer Science, p. 51-70 (Springer 2011).
Frikken et al., "Robust Authentication using Physically Unclonable Functions," Information Security, vol. 5735 of Lecture Notes in Computer Science, pp. 262-277 (Springer 2009).
Handschuh et al., "Hardware Intrinsic Security from Physically Unclonable Functions," Towards Hardware-Intrinsic Security, Information Security and Cryptography, pp. 39-53 (Springer 2010).
Kirkpatrick et al., "PUF ROKs: A Hardware Approach to Read-Once Keys," Proceedings of the 6th ACM Symposium on Information, Computer and Communications Security, ASIACCS '11, pp. 155-164 (ACM 2011).
Paral et al., "Reliable and Efficient PUF-based Key Generation using Pattern Matching," IEEE International Symposium on Hardware-Oriented Security and Trust (HOST), pp. 128-133 (2011).
Rührmair et al., "PUFs in Security Protocols: Attack Models and Security Evaluations," 2013 IEEE Symposium on Security and Privacy, pp. 286-300 (2013).
Van Dijk et al., "Physical Unclonable Functions in Cryptographic Protocols: Security Proofs and Impossibility Results," Cryptology ePrint Archive, Report 2012/228 (2012).
Wu et al., "On Foundation and Construction of Physical Unclonable Functions," IACR Cryptology ePrint Archive, 171 (2010).
Yu et al., "Lightweight and Secure PUF Key Storage using Limits of Machine Learning," Proceedings of the 13th international conference on Cryptographic Hardware and Embedded Systems, CHES'11, pp. 358-373 (Springer 2011).
Maiti et al., "The Impact of Aging on an FPGA-Based Physical Unclonable Function," International Conference on Field Programmable Logic and Applications (FPL), pp. 151-156 (2011).
Peeters et al., "Toward More Secure and Reliable Access Control," Pervasive Computing, IEEE 11:3 (IEEE Computer Society 2011).
Peeters, "Security Architecture for Things That Think," Diss. Ph. D. thesis, KU Leuven, Jun. 2012.
Schuster, "Side-Channel Analysis of Physical Unclonable Functions (PUFs)," Master's thesis,Technische (Universitat Munchen 2010).
Krzywiecki et al., "Collusion Resistant Anonymous Broadcast Encryption Scheme based on PUF," Trust 2011, Pittsburgh.
Kocher et al., "Introduction to Differential Power Analysis," Cryptography Research, Inc. (2011).
Kocher et al., "Differential Power Analysis," Proceedings of the 19th Annual International Cryptology Conference on Advances in Cryptology, CRYPTO '99, pp. 388-397 (Springer 1999).
Rührmair et al., "Power and Timing Side Channels for PUFs and their Efficient Exploitation," IACR Cryptology ePrint Archive 2013, 851 (2013).
Kirkpatrick et al., "Software Techniques to Combat Drift in Puf-based Authentication Systems," Workshop on Secure Component and System Identification (2010).
Coron, "Resistance Against Differential Power Analysis for Elliptic Curve Cryptosystems," Cryptographic Hardware and Embedded Systems, vol. 1717 of Lecture Notes in Computer Science, pp. 292-302 (Springer 1999).
Krzywiecki et al., "Coalition resistant anonymous broadcast encryption scheme based on PUF," Trust and Trustworthy Computing (Springer Berlin Heidelberg 2011).
Shamir, "How to Share a Secret," Communs. of the ACM, 22:11, pp. 612-613 (ACM 1979).
Ertaul et al., "ECC Based Threshold Cryptography for Secure Data Forwarding and Secure Key Exchange in MANET (I)," Networking 2005, Networking Technologies, Services, and Protocols; Performance of Computer and Communication Networks; Mobile and Wireless Communications Systems, vol. 3462 of Lecture Notes in Computer Science, pp. 102-113 (Springer Berlin Heidelberg 2005).
Feldman, "A Practical Scheme for Non-interactive Verifiable Secret Sharing," Proceedings of the 28th Annual Symposium on Foundations of Computer Science, SFCS '87, pp. 427-438 (IEEE Computer Society 1987).
Pedersen, "Non-Interactive and Information-Theoretic Secure Verifiable Secret Sharing," Advances in Cryptology, CRYPTO 91, vol. 576 of Lecture Notes in Computer Science, pp. 129-140 (Springer 1992).
Chen et al., "An efficient threshold group signature scheme," IEEE Region 10 Conference TENCON, vol. B, pp. 13-16 vol. 2 (2004).
Khoshroo et al., "Design and Evaluation of FPGA-based Hybrid Physically Unclonable Functions," Master Thesis (Western University, Ontario, 2013).
Ibrahim et al., "A Robust Threshold Elliptic Curve Digital Signature providing a New Verifiable Secret Sharing Scheme," IEEE 46th Midwest Symposium on Circuits and Systems, vol. 1, pp. 276-280 (2003).
Garcia-Alfaro, "Security Threat Mitigation Trends in Low-cost RFID Systems," Data Privacy Management and Autonomous Spontaneous Security (Springer Berlin Heidelberg 2010).
Shao, "Repairing Efficient Threshold Group Signature Scheme," International Journal of Network Security (2008).
Duc et al., "A survey on RFID security and provably secure grouping-proof protocols," Int'l J. Internet Tech. and Secured Transactions, 2:3/4 (2010).
Changgen et al., "Threshold Signcryption Scheme based on Elliptic Curve Cryptosystem and Verifiable Secret Sharing," International Conference on Wireless Communications, Networking and Mobile Computing, vol. 2, pp. 1182-1185 (2005).
International Search Report and Written Opinion dated Jun. 3, 2016 for Application No. PCT/US2016/021275.
ASAEDA et al., Structuring Proactive Secret Sharing in Mobile Ad-hoc Networks. $1^{st}$ International Symposium on Wireless Pervasive Computing. Jan 18, 2006. 6 pages.
International Search Report and Written Opinion dated Sep. 16, 2015 for Application No. PCT/US2015/036937.
International Preliminary Report on Patentability dated Jun. 16, 2016 for Application No. PCT/US2015/036937.
International Search Report and Written Opinion dated Jun. 3, 2016 for Application No. PCT/US2016/021264.
[No Author Listed], D6.5: Publishable Summary. HINT. Seventh Framework Programme. Project 317930. Dec. 11, 2013. 5 pages.
Abercrombie et al., Secure Cryptographic Key Management System (CKMS) Considerations for Smart Grid Devices. CSIIRW '11 Proceedings of the Seventh Annual Workshop on Cyber Security and Information Intelligence Research, Oak Ridge, TN. Article No. 59. Oct. 12-14, 2011. 4 pages.
Al Ibrahim et al., Cyber-Physical Security Using System-Level PUFs. 7th International IEEE Wireless Communications and Mobile Computing Conference (IWCMC). 2011. 5 pages.
Asim et al., Physical Unclonable Functions and Their Applications to Vehicle System Security. Vehicular Technology Conference, VTC Spring 2009. 10 pages.
Dwoskin et al., Hardware-rooted Trust for Secure Key Management and Transient Trust. Proceedings of the 14th ACM Conference: Computer & Communications Security. Nov. 2, 2007;389-400.
Feiri et al., Efficient and Secure Storage of Private Keys for Pseudonymous Vehicular Communication. ACM CyCAR '13. Nov. 4, 2013;9-18.
Gardner et al., Toward Trusted Embedded Systems. 2nd Annual NSA Trusted Computing Conference and Exposition. Orlando, FL. Sep. 20, 2011. 25 pages.
Goldwasser et al., One-time programs, Proceedings of the 28th Annual conference on Cryptology: Advances in Cryptology. CRYPTO 2008. 2008;39-56.
Guajardo et al., FPGA intrinsic PUFs and Their Use for IP Protection. Proceedings of the 9th Cryptographic Hardware and Embedded Systems Workshop (CHES). 2007;4727. 22 pages.
Guajardo et al., Physical Unclonable Functions and Public-Key Crypto for FPGA IP Protection. International Conference on Field Programmable Logic and Applications. 2007. 8 pages.

(56) References Cited

OTHER PUBLICATIONS

Horstmeyer et al., Physically secure and fully reconfigurable data storage using optical scattering. IEEE International Symposium on Hardware Oriented Security and Trust (HOST). 2015;157-62. 6 pages.
Huang et al., To verify embedded system software integrity with TCM and FPGA. IEEE. Aug. 2010;65-70.
Kerr et al., PEAR: A Hardware Based Protocol Authentication System. SPRINGL '10 Proceedings of the 3rd ACM 3IGSPATIAL International Workshop on Security and Privacy in GIS and LBS. 2010. 8 pages.
Kerr, Secure Physical System Design Leveraging PUF Technology. Purdue University. Thesis. May 2012. 87 pages.
Khandavilli, A Mobile Role Based Access Control System Using Identity Based Encryption With Non-Interactive 7ero Knowledge Proof Of Authentication. Dalhousie University Repository, Faculty of Graduate Studies. Thesis. Apr. 5, 2012. 65 pages.
Kirkpatrick et al., Enforcing Physically Restricted Access Control for Remote Data. Proceedings of CODASPY. 2011. 10 pages.
Kirkpatrick et at, Physically Restricted Authentication and Encryption for Cyber-physical Systems. DHS Workshop on Future Directions in Cyber-physical Systems Security. 2009. 5 pages.
Kish et al., Physical Uncloneable Function Hardware Keys Utilizing Kirchhoff-Law Johnson-Noise Secure Key Exchange and Noise-Based Logic. Fluctuation Noise Lett. 2013;12. 9 pages.
Langheinrich et al., Practical Minimalist Cryptography for RFID Privacy. IEEE Sys J. Dec. 2007;1(2). 19 pages.
Langheinrich et al., RFID Privacy Using Spatially Distributed Shared Secrets. International Symposium on Ubiquitous Computing Systems (UCS). 2007;1-16.
Lao et al., Reconfigurable architectures for silicon physical unclonable functions. IEEE International Conference on Electro/Information Technology (EIT). 2011;1-7.
Maes et al., Intrinsic PUFs from flip-flops on reconfigurable devices. 3rd Benelux Workshop on Information and System Security (WISSec 2008). 2008. 17 pages.
Maiti et al., Physical Unclonable Function and True Random Number Generator: a Compact and Scalable implementation. GLSVLSI '09 Proceedings of the 19th ACM Great Lakes Symposium on VLSI. 2009. 4 pages.
Owusu et al., Oasis: On Achieving a Sanctuary for Integrity and Secrecy on Untrusted Platforms. Proceedings of the 2013 ACM SIGSAC conference on Computer & communications security. ACM. 2013;13-24. 12 pages.
Potkonjak et al., Differential Public Physically Unclonable Functions: Architecture and Applications. DAC '11 Proceedings of the 48th Design Automation Conference. 2011. 7 pages.
Rigaud, ed., D3.1: Report on Protocol choice and implementation. HINT. Project 317930. Aug. 4, 2014. 35 pages.
Rust, ed., D1.1: Report on use case and architecture requirements. Seventh Framework Programme. Holistic Approaches for Integrity of ICT-Systems. ICT-317930. Feb. 28, 2013. 50 pages.
Sadeghi et al., Short Paper: Lightweight Remote Attestation Using Physical Functions. ACM. Jun. 2011;109-14.
Suh et al., Aegis: A Single-Chip Secure Processor. IEEE Des Test Comp. 2007;570-80.
Tuyls et al., Capacity and Examples of Template Protecting Biometric Authentication Systems. Biometric Authentication. 2004;3087:158-70. 13 pages.
Yu et al., Secure and robust error correction for physical unclonable functions. IEEE Des Test. Jan. 2010;27(1):48-65.
Zhang et al., Exploiting Process Variation and Programming Sensitivity of Phase Change Memory for Reconfigurable Physical Unclonable Functions. IEEE Trans Info Forensics Sec. 2014;9(6):921-32.
U.S. Appl. No. 14/704,947, filed May 5, 2015, Gardner et al.
U.S. Appl. No. 15/614,367, filed Jun. 5, 2017, Walsh et al.
U.S. Appl. No. 15/176,766, filed Jun. 8, 2016, Wallrabenstein.
PCT/US2015/036937, dated Sep. 16, 2015, International Search Report and Written Opinion.
PCT/US2015/036937, dated Jun. 16, 2016, International Preliminary Report on Patentability.
PCT/US2016/021264, dated Jun. 3, 2016, International Search Report and Written Opinion.
International Preliminary Report on Patentability dated Sep. 14, 2017 in connection with International Application No. PCT/US2016/021275.
PCT/US2016/021275, dated Sep. 14, 2017, International Preliminary Report on Patentability.

* cited by examiner

US 9,946,858 B2

AUTHENTICATION SYSTEM AND DEVICE INCLUDING PHYSICAL UNCLONABLE FUNCTION AND THRESHOLD CRYPTOGRAPHY

CROSS REFERENCE TO RELATED APPLICATIONS

This application is a continuation-in-part of and claims priority under 35 U.S.C. § 120 to U.S. patent application Ser. No. 14/704,914 filed May 5, 2015, entitled "AUTHENTICATION SYSTEM AND DEVICE INCLUDING PHYSICAL UNCLONABLE FUNCTION AND THRESHOLD CRYPTOGRAPHY," which claims priority under 35 U.S.C. § 119(e) to U.S. Provisional Application Ser. No. 61/988,848, entitled "AUTHENTICATION USING ELLIPTIC CURVES AND PHYSICALLY UNCLONABLE FUNCTIONS" filed May 5, 2014; and this application claims priority under 35 U.S.C. § 119(e) to U.S. Provisional Application Ser. No. 62/150,586 filed Apr. 21, 2015, and Ser. No. 62/128,920 filed Mar. 5, 2015, each of the above listed provisional applications are incorporated by reference herein in their entirety.

FIELD OF THE INVENTION

This disclosure relates generally to hardware verification, and in particular but not exclusively, to binding authentication to protect against tampering and subversion by substitution.

BACKGROUND OF THE INVENTION

The unique properties of PUFs provide several advantages to cryptographic constructions. In general, PUFs may provide some or all of three main advantages: (1) eliminating private key storage, (2) providing tamper detection, and (3) establishing a hardware root-of-trust. Private key storage can be eliminated by evaluating a PUF to dynamically regenerate a value unique to an identified piece of hardware having that PUF. As to tamper detection, a PUF's unclonable properties (e.g., wire delays, resistance) may be such that modification to the PUF irreversibly alters the PUF's mapping from challenges (inputs) to responses (outputs) after enrollment (however, not against malicious modifications before enrollment, e.g., Becker et al., "Stealthy Dopant-Level Hardware Trojans," *Cryptographic Hardware and Embedded Systems—CHES* 2013, volume 8086 of *Lecture Notes in Computer Science*, pages 197-214, Springer, 2013). These PUF properties may be used to produce a hardware-unique, tamper-protected value from which a hardware root-of-trust can be established.

Rührmair et al. ("Modeling Attacks on Physical Unclonable Functions," *Proceedings of the 17th ACM conference on Computer and communications security*, CCS '10, pages 237-249, ACM, 2010) define three distinct classes of PUF devices:

A Weak PUF is typically used only to derive a secret key. The challenge space may be limited, and the response space is assumed to never be revealed. Typical constructions include the SRAM (Holcomb et al., "Initial SRAM State as a Fingerprint and Source of True Random Numbers for RFID Tags," *In Proceedings of the Conference on RFID Security*, 2007), Butterfly (Kumar et al., "Extended abstract: The Butterfly PUF Protecting IP on Every FPGA," *IEEE International Workshop on Hardware-Oriented Security and Trust*, pages 67-70, 2008), Arbiter (Lee et al., "A technique to build a secret key in integrated circuits for identification and authentication applications," *IEEE Symposium on VLSI Circuits: Digest of Technical Papers*, pages 176-179, 2004), Ring Oscillator (Suh et al., "Physical Unclonable Functions for Device Authentication and Secret Key Generation," *Proceedings of the 14th annual Design Automation Conference*, DAC '07, pages 9-14, ACM, 2007), and Coating (Tuyls et al., "Read-Proof Hardware from Protective Coatings," *Proceedings of the 8th international conference on Cryptographic Hardware and Embedded Systems*, CHES '06, pages 369-383, Springer, 2006) PUFs.

A Strong PUF is assumed to be (i) physically impossible to clone, (ii) impossible to collect a complete set of challenge response pairs in a reasonable time (typically taken to be on the order of weeks), and (iii) difficult to predict the response to a random challenge. For example, the super-high information content (SHIC) PUF described by Rührmair ("Applications of High-Capacity Crossbar Memories in Cryptography," *IEEE Trans. Nanotechnol.*, volume 10, no. 3:489-498, 2011) may be considered a Strong PUF.

A Controlled PUF satisfies all of the criteria for strong PUFs, and additionally implements an auxiliary control unit capable of computing more advanced functionalities to cryptographically augment protocols.

PUF output is noisy in that it varies slightly despite evaluating the same input. This is generally addressed with fuzzy extraction, a method developed to eliminate noise in biometric measurements. (See Juels et al., "A Fuzzy Commitment Scheme," *Proceedings of the 6th ACM conference on Computer and Communications Security*, CCS '99, pages 28-36, ACM, 1999). Fuzzy extraction may in part be employed within a device having a PUF such as within an auxiliary control unit, such that the output is constant for a fixed input. Fuzzy extraction (or reverse fuzzy extraction) may for example employ a "secure sketch," as described by Juels et al. to store a sensitive value $p_i^{priv}$ to be reconstructed and a helper string $helper_i$ for recovering $p_i^{priv}$. A secure sketch SS for input string O, where ECC is a binary (n, k, 2t+1) error correcting code of length n capable of correcting t errors and $p_i^{priv} \leftarrow \{0, 1\}^k$ is a k-bit value, may for example be defined as $SS(O; p_i^{priv}) = O \oplus ECC(p_i^{priv})$. The original value V then may be reproduced given the helper string $helper_i$ and an input O' within a maximum Hamming distance t of O using a decoding scheme D for the error-correcting code ECC and O', as $D(helper_i \oplus O') = D(O \oplus ECC(p_i^{priv}) \oplus O') = p_i^{priv}$.

A physical unclonable function $P_d: \{0, 1\}^{K_1} \to \{0, 1\}^{K_2}$ bound to a device d preferably exhibits the following properties:

1. Unclonability: $\Pr[\text{dist}(y,x) \leq t | x \to U_{K_1}, y \to P(x), z \to P'] \leq \epsilon_1$, the probability of duplicating PUF P with a clone PUF P' such that their output distributions are t-statistically close is less than some sufficiently small $\epsilon_1$.

2. Unpredictability: It is desirable that an adversary cannot predict a device's PUF response r for a challenge c with more than negligible probability (at least without physical access to the device), and that helper data does not reveal anything to an adversary about PUF responses. Assuming that all entities are bound to probabilistic polynomial-time (PPT), i.e., can only efficiently perform computation requiring polynomially many operations with respect to a global security parameter λ (which refers to the number of bits in the relevant parameter), $\text{Adv}_{\mathcal{A}}^{\text{PUF-PRED}}(\kappa_2) := \Pr[r=r']$, denoting the probability of the adversary $\mathcal{A}$ guessing the correct response r of the PUF P to the challenge c, is preferably negligible in $\kappa_2$. This can be assessed, for example, through a game between an adversary $\mathcal{A}$ and a PUF device $P: \{0, 1\}^{\kappa_1} \mapsto \{0, 1\}^{\kappa_2}$ mapping input strings from the challenge space $\mathcal{C}_P$ of length $\kappa_1$ to the response space $\mathcal{R}_P$ of length $\kappa_2$ where $\lambda$ is the security parameter for the protocol, given in unary as $1^\lambda$.

| PUF-PRED: PUF Prediction Game | | |
|---|---|---|
| Adversary $\mathcal{A}$ | | PUF Device P |
| (1) | $c_i \in \bar{\mathcal{C}}_P \subset \mathcal{C}_P$, $0 \le i \le \text{poly}(\lambda)$ | $\rightarrow$ |
| | | $\leftarrow$ $r_i = P(c_i) \in \bar{\mathcal{R}}_P$ (2) $\bar{\mathcal{R}}_P \subset \mathcal{R}_P$, $0 \le i \le \text{poly}(\lambda)$ |
| (3) | Challenge $c \notin \bar{\mathcal{C}}_P$ | $\rightarrow$ |
| (4) | $c'_i \in \bar{\mathcal{C}}'_P \subset \mathcal{C}_P$, $c \notin \bar{\mathcal{C}}'_P$, $0 \le i \le \text{poly}(\lambda)$ | $\rightarrow$ |
| | | $\leftarrow$ $r'_i = P(c'_i) \in \bar{\mathcal{R}}'_P$ (5) $\bar{\mathcal{R}}'_P \subset \mathcal{R}_P$, $0 \le i \le \text{poly}(\lambda)$ |
| (6) | Guess $r' \stackrel{?}{\leftarrow} P(c)$ | |

The game proceeds as follows:
1. The adversary $\mathcal{A}$ issues polynomially many (w.r.t. the security parameter $\lambda$) challenges $c_i \in \bar{\mathcal{C}}_P$ to the PUF device P, where the challenge set $\bar{\mathcal{C}}_P$ is a proper subset of the entire challenge space $\mathcal{C}_P$.
2. The PUF device P returns the responses $\{r_i | r_i \leftarrow P(c_i)\}$ to $\mathcal{A}$.
3. The adversary $\mathcal{A}$ eventually outputs a challenge c that was not in the original set of challenge queries $\bar{\mathcal{C}}_P$. The adversary is not allowed to query the PUF device P on the committed challenge c.
4. The adversary $\mathcal{A}$ may once again issue a new set of polynomially many challenges $c'_i \in \bar{\mathcal{C}}_P$ to the PUF device P. The adversary is not allowed to query the PUF device P on the committed challenge c.
5. The PUF device P returns the responses $\{r'_i | r'_i \leftarrow P(c'_i)\}$ to $\mathcal{A}$.
6. The adversary $\mathcal{A}$ eventually outputs a guess $r'$ for P's response to the committed challenge c.

The adversary only wins the game when guess $r'$ is equal to P's actual response $r \leftarrow P(c)$ to $\mathcal{A}$'s committed challenge c. (As noted, the PUF's output is noisy and will vary slightly on any fixed input, so the equality is typically taken with respect to the output of a fuzzy extractor (e.g., Dodis et al., "Fuzzy Extractors: How to Generate Strong Keys from Biometrics and Other Noisy Data," *SIAM J. Comput.*, volume 38, no. 1:97-139, 2008)).

3. Robustness: $\Pr[\text{dist}(y, z) > t | x \leftarrow U_{\kappa_1}, y \leftarrow P(x), z \leftarrow P(x)] \le \epsilon_2$, i.e., the probability of a fixed PUF P yielding responses t-distant on the same input x is less than some sufficiently small $\epsilon_2$.

4. Indistinguishability: The output of the PUF device (typically fuzzy extractor output) preferably is computationally indistinguishable from a random string of the same length l, such that a PPT adversary $\mathcal{A}$'s advantage $\text{Adv}_{\mathcal{A}}^{\text{PUF-IND}}(l)$ is at most negligibly more than ½. The indistinguishability of a PUF can be assessed, for example, through a game in which an adversary $\mathcal{A}$ is asked to differentiate between the output r of the fuzzy extractor for a PUF P and a randomly chosen string $s \in \{0, 1\}^l$ of the same length l.

| PUF-IND: PUF Indistinguishability Game | | |
|---|---|---|
| Adversary $\mathcal{A}$ | | PUF Device P |
| (1) | $c_i \in \mathcal{CH} \subset \mathcal{C}_P$, $0 \le i \le \text{poly}(\lambda)$ | $\rightarrow$ $R_i \leftarrow \text{rand} \in \{0, 1\}^\lambda$ $H_i \leftarrow \text{ECC}(R_i) \oplus P(c)$ |
| | | $\leftarrow$ $H_i \in \bar{\mathcal{R}}_P \subset \mathcal{R}_P$, (2) $0 \le i \le \text{poly}(\lambda)$ |
| (3) | $c_i \in \bar{\mathcal{CH}} \subset \mathcal{C}_P$, $0 \le i \le \text{poly}(\lambda)$ | $\rightarrow$ |
| | | $\leftarrow$ $R_i \in \bar{\mathcal{R}}_P \subset \mathcal{R}_P$, (4) $0 \le i \le \text{poly}(\lambda)$ |
| (5) | Challenge $c \notin \bar{\mathcal{CH}}$ | $\rightarrow$ $b \in \{0, 1\}$ |
| | | $\leftarrow$ $b(s \in \{0, 1\}^l) +$ (6) $(1 - b)(R_i)$, $R_i = D(H_i \oplus P(c))$ |
| (7) | $c'_i \in \mathcal{CH} \subset \mathcal{C}_P$, $c \ne c'_i$, $0 \le i \le \text{poly}(\lambda)$ | $\rightarrow$ |
| | | $\leftarrow$ $R'_i \in \bar{\mathcal{R}}_P \subset \mathcal{R}_P$, (8) $0 \le i \le \text{poly}(\lambda)$ |
| (9) | Guess $b' \stackrel{?}{=} b$ | $\rightarrow$ |

This game proceeds as follows:
1. Adversary $\mathcal{A}$ executes the enrollment phase on any challenge $c_i \in \mathcal{C}_P$.
2. The PUF device returns the corresponding helper string $H_i$, which blinds the error corrected sensitive value $\text{ECC}(R_i)$ with the output of the PUF P(c). Denote this set of challenge-helper pairs $(c_i, H_i)$ as $\mathcal{CH}$.
3. Adversary $\mathcal{A}$ now requests the PUF response $r_i = P(c_i)$ for any $c_i \in \mathcal{CH}$. Denote the set of requested challenges in this step $\bar{\mathcal{CH}}$.
4. For all requests $c_i \in \bar{\mathcal{CH}}$, the PUF device returns the set $\{r_i | r_i \leftarrow P(c_i)\}$.
5. Adversary $\mathcal{A}$ selects a challenge $c \in \mathcal{CH}$, such that $\mathcal{A}$ has $H_i$ but not $R_i$ for c. The PUF device chooses a bit $b \in \{0, 1\}$ uniformly at random.
6. If b=0, $\mathcal{A}$ is given $R_i = D(H_i \oplus P(c))$. Otherwise, if b=1 then $\mathcal{A}$ is given a random string $s \in \{0, 1\}^l$.
7. Adversary $\mathcal{A}$ is allowed to query the PUF device for $c'_i \in \mathcal{CH}$ so long as no $c'_i = c$.
8. For all requests $c'_i \ne c$, the PUF device returns the set $\{r'_i | r'_i \rightarrow P(c'_i)\}$.
9. The adversary outputs a guess bit $b'$, and succeeds when $b' = b$.

Related assessments of PUFs are provided by Hori et al., "Quantitative and Statistical Performance Evaluation of Arbiter Physical Unclonable Functions on FPGAs," 2010 *International Conference on Reconfigurable Computing and FPGAs (ReConFig)*, pages 298-303, 2010; Maiti, *A Systematic Approach to Design an Efficient Physical Unclonable Function*, dissertation, Virginia Tech, 2012, and others.

Literature on physical unclonable functions evaluates the properties of PUF hardware design (e.g., Gassend et al., "Silicon Physical Random Functions," *Proceedings of the 9th ACM conference on Computer and communications security*, CCS '02, pages 148-160, ACM, 2002; Katzenbeisser et al., "PUFs: Myth, Fact or Busted? A Security Evaluation of Physically Unclonable Functions (PUFs) Cast in Silicon," *Cryptographic Hardware and Embedded Systems—CHES '12*, pages 283-301, Springer, 2012; Ravikanth, *Physical one-way functions*, Ph.D. thesis, 2001; Rührmair et al., "Applications of High-Capacity Crossbar Memories in Cryptography," *IEEE Trans. Nanotechnol.*, volume 10, no. 3:489-498, 2011; Suh et al., "Physical Uncloneable Functions for Device Authentication and Secret Key Generation," *Proceedings of the 4th annual Design Automation Conference*, DAC '07, pages 9-14, ACM, 2007; Yu et al., "Recombination of Physical Uncloneable Functions," GOMACTech, 2010), provides formal theoretical models of PUF properties, and designs protocols around those definitions (cf. Armknecht et al., "A Formalization of the Security Features of Physical Functions," *Proceedings of the 2011 IEEE Symposium on Security and Privacy*, SP '11, pages 397-412, IEEE Computer Society, 2011; Brzuska et al., "Physically Uncloneable Functions in the Universal Composition Framework," *Advances in Cryptology—CRYPTO 2011—31st Annual Cryptology Conference*, volume 6841 of *Lecture Notes in Computer Science*, page 51, Springer, 2011; Frikken et al., "Robust Authentication using Physically Uncloneable Functions," *Information Security*, volume 5735 of Lecture Notes in Computer Science, pages 262-277, Springer, 2009; Handschuh et al., "Hardware Intrinsic Security from Physically Uncloneable Functions," *Towards Hardware-Intrinsic Security*, Information Security and Cryptography, pages 39-53, Springer, 2010; Kirkpatrick et al., "PUF ROKs: A Hardware Approach to Read-Once Keys," *Proceedings of the 6th ACM Symposium on Information, Computer and Communications Security*, ASIACCS '11, pages 155-164, ACM, 2011; Paral et al., "Reliable and Efficient PUF-based Key Generation using Pattern Matching," *IEEE International Symposium on Hardware-Oriented Security and Trust (HOST)*, pages 128-133, 2011; Rührmair et al., "PUFs in Security Protocols: Attack Models and Security Evaluations," 2013 IEEE Symposium on Security and Privacy, volume 0:286-300, 2013; van Dijk et al., "Physical Uncloneable Functions in Cryptographic Protocols: Security Proofs and Impossibility Results," Cryptology ePrint Archive, Report 2012/228, 2012; Wu et al., "On Foundation and Construction of Physical Uncloneable Functions," 2010; Yu et al., "Lightweight and Secure PUF Key Storage using Limits of Machine Learning," *Proceedings of the 13th international conference on Cryptographic Hardware and Embedded Systems*, CHES'11, pages 358-373, Springer, 2011).

Prior art PUF-based protocols fall into two broad categories: (1) a simple challenge-response provisioning process like the one described below in Protocol 1, or (2) cryptographic augmentation of a device's PUF response such that the raw PUF output never leaves the device. These approaches may require external entities to handle auxiliary information (e.g., challenges and their associated helper data) that is unsupported or superfluous in existing public key cryptography standards, and/or involve a hardware device authenticating to a challenge applied during an initial enrollment process, and/or are premised on the hardware device always recovering essentially the same response to a given challenge.

While a given challenge-response pair reflects the hardware state of a device when the pair was collected, the device will age and its hardware state drift over time. As the PUF hardware ages, the number of errors present in the responses may increase. Maiti et al. ("The Impact of Aging on an FPGA-Based Physical Uncloneable Function," *International Conference on Field Programmable Logic and Applications (FPL)*, pages 151-156, 2011) study the effects of simulated aging on PUF hardware by purposefully stressing the devices beyond normal operating conditions. By varying both temperature and voltage, the authors were able to show a drift in the intra-PUF variation that, over time, will lead to false negatives. Maiti et al. note that the error drift strictly affected the intra-PUF error rate distribution tending towards the maximum entropy rate of 50%. After enough time elapses, the hardware device may no longer be able to recover the proper response for the enrolled challenge.

For example, assume that a specific challenge $c_i$ is issued to a device during enrollment, with the device returning a public token {$commitment_i$, $helper_i$} that links the device's hardware identity with the challenge c. To be authenticated, the device uses the pair {$c_i$, $helper_i$} to recover its private identity $p_i^{priv}$. As shown in FIG. 10, over time the PUF hardware may reach a time (e.g., at time τ=5 in the example of FIG. 10, which for simplicity assumes a drift that occurs linearly over time) at which hardware aging has increased the errors beyond the device's error correction limit, and the device is no longer able to reliably regenerate its private key.

Kirkpatrick et al. ("Software Techniques to Combat Drift in PUF-based Authentication Systems," *Workshop on Secure Component and System Identification*, 2010) describe a method for detecting hardware aging drift, and responding by updating the device's challenge-commitment pair stored on an external server. This approach requires that the server maintain auxiliary information in the form of challenge-commitment pairs, however, and that a periodic protocol be executed between the server and the device.

Another challenge facing PUF-based systems is side channel attacks, which seek to observe and analyze auxiliary environmental variables to deduce information about the sensitive PUF output. For example, electromagnetic (EM) analysis (e.g., Merli et al., "Semi-invasive EM Attack on FPGA RO PUFs and Countermeasures," *Proceedings of the Workshop on Embedded Systems Security*, WESS '11, pages 2:1-2:9, ACM, 2011; Merli et al., "Side-Channel Analysis of PUFs and Fuzzy Extractors," *Trust and Trustworthy Computing*, volume 6740 of Lecture Notes in Computer Science, pages 33-47, Springer, 2011; Schuster, *Side-Channel Analysis of Physical Uncloneable Functions (PUFs)*, Master's thesis, Technische Universitat Munchen, 2010) extracts PUF output bits by observing changing EM fields during device operation. Another side channel attack methodology is (simple or differential) power analysis (e.g., Karakoyunlu et al., "Differential template attacks on PUF enabled cryptographic devices," *IEEE International Workshop on Information Forensics and Security (WIFS)*, pages 1-6, 2010; Kocher et al., "Introduction to Differential Power Analysis," Cryptography Research, Inc., 2011; Kocher et al., "Differential Power Analysis," *Proceedings of the 19th Annual International Cryptology Conference on Advances in Cryptology*, CRYPTO '99, pages 388-397, Springer, 1999; Rührmair et al., "Power and Timing Side Channels for PUFs and their Efficient Exploitation," 2013), where power traces are collected from a device and analyzed to extract sensitive information (e.g., PUF output bits). Over many observations of a device recovering essentially the same response to a fixed challenge, an adversary can discover the sensitive PUF output.

While it is known that the effectiveness of side channel attacks may in some systems be reduced by introducing randomness (Coron, "Resistance Against Differential Power Analysis For Elliptic Curve Cryptosystems," *Cryptographic Hardware and Embedded Systems*, volume 1717 of *Lecture Notes in Computer Science*, pages 292-302, Springer, 1999), disguising sensitive values in this way may leave some vulnerability since the underlying values remain static and/or introduce additional complexity and/or processing overhead.

SUMMARY OF THE INVENTION

In an authentication system according to the present invention, a PUF's challenge-response behavior may be internalized and used to maintain shares of a private key. This approach may be implemented such that a PUF-enabled hardware device can execute arbitrary threshold cryptographic operations (e.g., decryption, digital signature generation, zero knowledge proofs) without ever generating, reconstructing, or storing a private key. It may also be implemented so as to eliminate the need for any external entity to issue challenges and store helper data for a device, and/or so as to enable PUF-based protocols that an external entity cannot distinguish from standard public key protocols. In one embodiment, a device may be equipped with a root-of-trust such as a PUF and configured to periodically refresh all sensitive values that must be generated, recovered, or processed by the device. This may be employed to mitigate PUF aging and/or side-channel attacks. The threshold share operations may be staggered such that one share always remains stored.

DETAILED DESCRIPTION OF EMBODIMENTS

Figure 1:
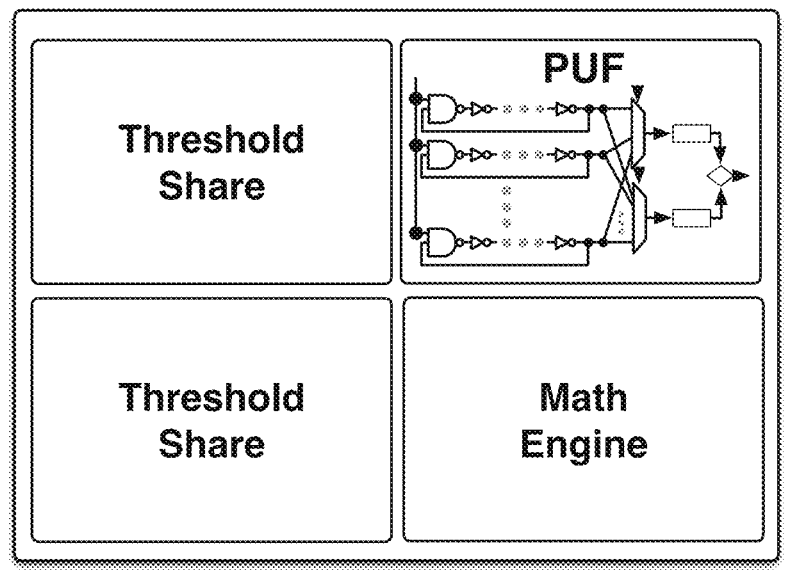
FIG. 1 is a functional diagram of a device having a single PUF circuit and two threshold shares.

The present invention is described with reference to the example of an embodiment utilizing elliptic curve cryptography (including the associated terminology and conventions), but the inventive concept and teachings herein apply equally to various other cryptographic schemes such as ones employing different problems like discrete logarithm or factoring (in which regard the teachings of U.S. Pat. No. 8,918,647 are incorporated here by reference), and the invention is not limited by the various additional features described herein that may be employed with or by virtue of the invention.

Threshold Cryptography

Threshold cryptography involves distributing cryptographic operations among a set of participants such that operations are only possible with the collaboration of a quorum of participants. A trusted dealer $\mathcal{D}$ generates a master asymmetric key pair $\langle \mathcal{P}^{pub}, \mathcal{P}^{priv}\rangle$ for the set of participants $p_i \in \mathcal{P}$, $|\mathcal{P}|=n$. The private key is then split among the n participants, with each participant receiving a share of $\mathcal{P}^{priv}$. This constitutes a (t, n) sharing of $\mathcal{P}^{priv}$, such that a quorum of at least t participants must combine their private shares in order to perform operations using the master private key.

While other secret schemes can be used with the present invention (e.g., Blakley, "Safeguarding cryptographic keys," *Proceedings of the 1979 AFIPS National Computer Conference*, pages 313-317, AFIPS Press, 1979), an example will be described employing Shamir's polynomial interpolation construction ("How to Share a Secret," *Commun. ACM*, volume 22, no. 11:612-613, 1979), which can be used for sharing a secret. A polynomial f(•) of degree t−1 is defined, where the coefficients $c_i$ remain private: $f(x)=c_0+c_1 x+ \ldots +c_{t-1}x^{t-1}$ mod q. Without knowledge of the coefficients, f(•) can be evaluated when at least t points of f(•) are known by applying Lagrange's polynomial interpolation approach. A private key $\mathcal{P}^{priv}$ can be set as the free coefficient $c_0$ (i.e., $f(0)=\mathcal{P}^{priv}$), and a set of shares of the private key distributed to the participants (cf., e.g., Ertaul, "ECC Based Threshold Cryptography for Secure Data Forwarding and Secure Key Exchange in MANET (I)," NETWORKING 2005, *Networking Technologies, Services, and Protocols; Performance of Computer and Communication Networks; Mobile and Wireless Communications Systems*, volume 3462 of *Lecture Notes in Computer Science*, pages 102-113, Springer, 2005). To split the private key $\mathcal{P}^{priv}$ among n participants $p_i \in \mathcal{P}_{1 \le i \le n}$, the dealer computes $p_i$'s $\langle$public, private$\rangle$ key pair as $\langle r_i \cdot G \mod q, r_i\rangle$ such that $r_i=f(i)$, $i \ne 0$. Here, $G \in E/\mathbb{F}_p$ is a base point of order q for elliptic curve E, and $(P)_x$ (resp. $(P)_y$) refers to the x (resp. y) coordinate of point P on curve E. (The modulus that operations are performed under may be omitted where it is apparent from context). The public keys are made available to all participants, while the private keys are distributed securely to each participant (e.g., using the device's public key and ElGamal encryption). All participants are also given access to $(c_j \cdot G)_{0 \le j \le t-1}$, which allows them to verify their secret key and the public keys of other participants by checking that:

$$r_i \cdot G = \sum_{j=0}^{t-1} i^j (c_j \cdot G) \mod p$$

This constitutes a (t, n) verifiable secret sharing (VSS) (e.g., Feldman, "A Practical Scheme for Non-interactive Verifiable Secret Sharing," *Proceedings of the 28th Annual Symposium on Foundations of Computer Science*, SFCS '87, pages 427-438, IEEE Computer Society, 1987; Pedersen, "Non-Interactive and Information-Theoretic Secure Verifiable Secret Sharing," *Advances in Cryptology, CRYPTO 91*, volume 576 of *Lecture Notes in Computer Science*, pages 129-140, Springer, 1992) of the private key $\mathcal{P}^{priv}$, as participants are able to verify the legitimacy of their share with respect to a globally-known public key.

Now, given access to any t shares $\{(i, r_i)\}_{1 \leq i \leq t}$, where $f(\bullet)$ has degree t−1 and t≤n, the shares $(i, r_i)$ may be combined through Lagrange polynomial interpolation to evaluate f(x):

$$f(x) = \sum_{i=1}^{t} \left( r_i \cdot \left( \prod_{\substack{j=1 \\ j \neq i}}^{t} \frac{x - x_j}{x_i - x_j} \right) \right) \bmod q$$

This allows any quorum of t participants $p_i \epsilon \mathcal{P} \subseteq$, $\mathcal{P}$, $\mathcal{P}$ =t≤n to combine their shares $\{(i, r_i)\}_{1 \leq i \leq t}$ and recover the polynomial's free coefficient $c_0$=f(0), which is the master asymmetric private key $\mathcal{P}^{priv}$. Although the Lagrange form is used for the interpolating polynomial, other approaches (e.g., using a monomial basis or the Newton form) may be substituted. Similarly, although the exemplary construction evaluates f(•) rather than recover the coefficients, alternatively the latter may be accomplished using a Vandermonde matrix representation and solving the system of linear equations.

FIG. 3-FIG. 6 illustrate the Lagrange polynomial interpolation of $$P(x) = -\frac{x^3}{6} + \frac{3x^2}{2} - \frac{7x}{3} + 2.$$

Figure 3:
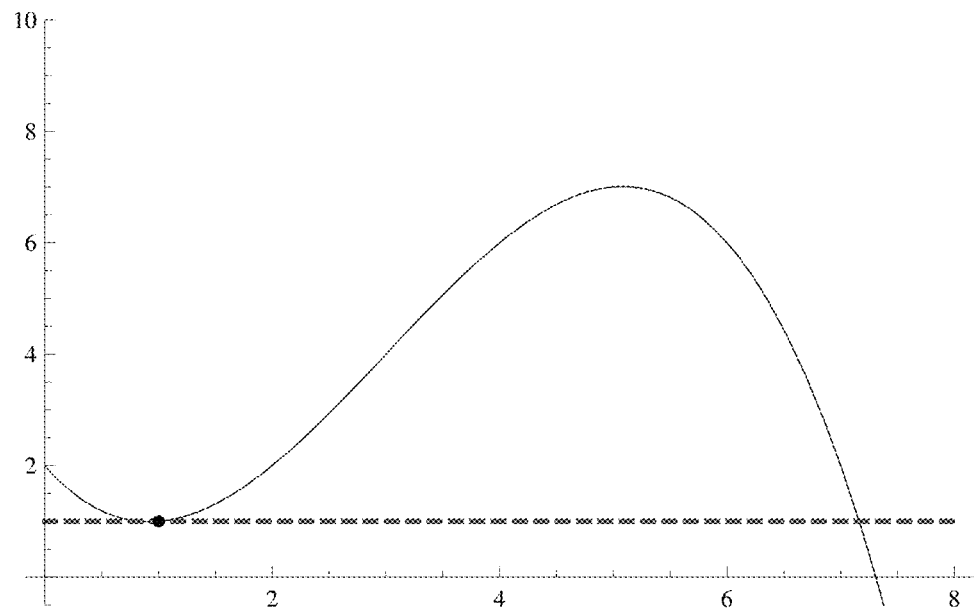
FIG. 3 is a graph illustrating an attempt to interpolate an example polynomial P(x) of degree d=3 given only one point, which fails as at least d+1 points are needed.
Figure 4:
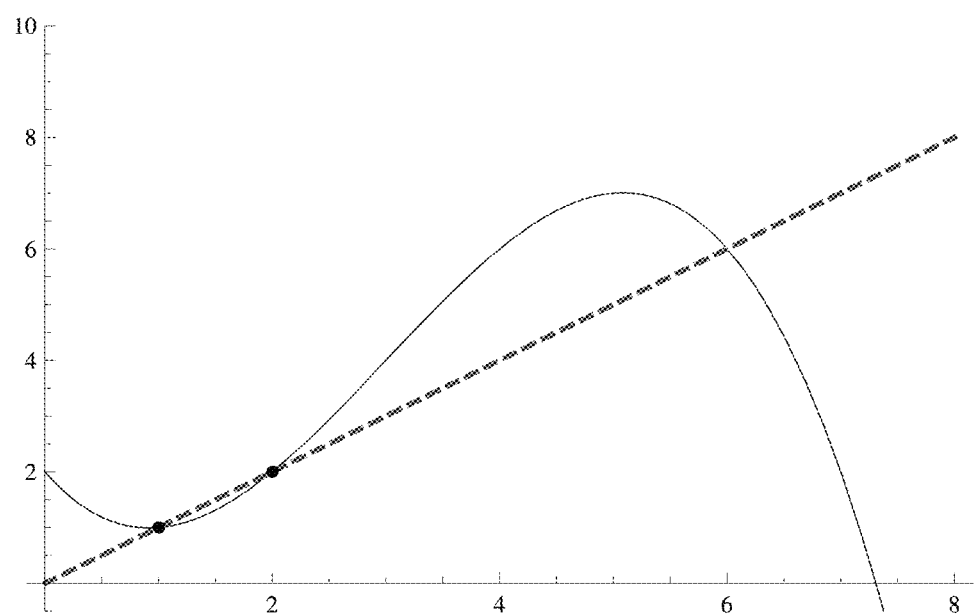
FIG. 4 illustrates a failed attempt to interpolate the same polynomial P(x) given two points.
Figure 5:
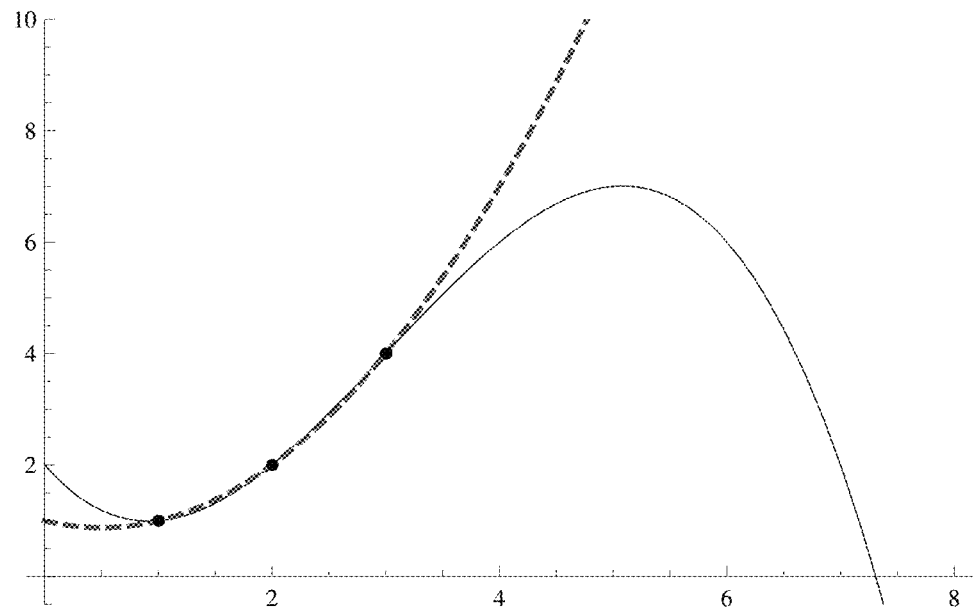
FIG. 5 illustrates a failed attempt to interpolate the same polynomial P(x) given three points.
Figure 6:
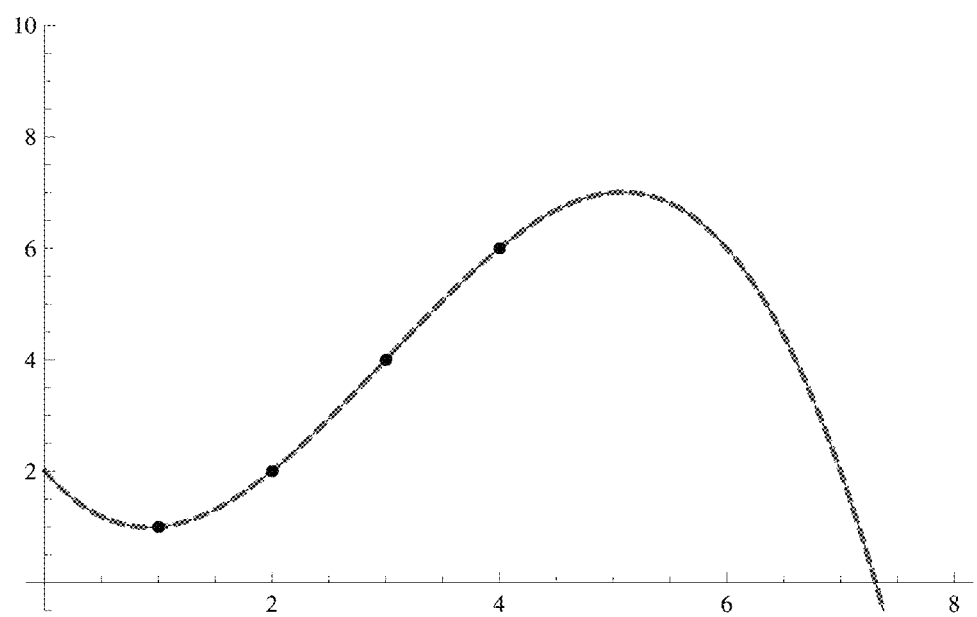
FIG. 6 illustrates a successful interpolation of P(x) given four points.

The interpolating polynomial $\overline{P}(\bullet)$ is generated from a set of κ points $\{(x_i, P(x_i))\}_{1 \leq i \leq \kappa}$. FIG. 3 illustrates the interpolating polynomial $\overline{P}(\bullet)$=1, which was generated from only a single point. FIG. 4 illustrates the interpolating polynomial $\overline{P}(\bullet)$=x, which was generated from two points. FIG. 5 illustrates the interpolating polynomial $$\overline{P}(\bullet) = \frac{x^2}{2} - \frac{x}{2} + 1,$$

which was generated from three points. FIG. 6 illustrates the interpolating polynomial $$\overline{P}(\bullet) = -\frac{x^3}{6} + \frac{3x^2}{2} - \frac{7x}{3} + 2,$$

which was generated from four points. As the degree of the polynomial is only three, any four points results in a perfect interpolation of the original polynomial. When the size of the set κ exceeds the degree of the polynomial t−1 (i.e., κ≥t), $\overline{P}(\bullet)$ perfectly interpolates the original polynomial P(•). Thus in this example, the interpolating polynomial is generated from four points, which exceeds the degree (3) of the polynomial. Note that given any set of κ<t points, no information about the secret P(0) is revealed, as an infinite number of polynomials of degree t−1 exist that satisfy the set of k<t points.

While an exemplary embodiment may use elliptic curve cryptography, it will be readily apparent that various other cryptographic frameworks (e.g., ElGamal, RSA, NTRU, etc.) could be employed. A number of threshold cryptographic operations can be carried out within this framework, using a variety of methods such as threshold encryption, decryption, and signing, threshold zero knowledge proofs of knowledge, threshold signcryption, and distributed key generation. Other elliptic curve mechanisms such as Massey-Omura, Diffie-Hellman, Menezes-Vanstone, Koyama-Maurer-Okamoto-Vanstone, Ertaul, Demytko, etc. could likewise be employed.

An entity in possession of a device's enrollment information $\{p_i^{pub}, c_i, \text{helper}_i\}$ can thus encrypt a message m such that only the target device is able to recover it, using a method such as ElGamal encryption:

---
ElGamal Encryption for Server s do
    Lookup: challenge $c_i$, generator G, modulus p and Helper $h_i$ for Device $p_i$
    Select $y \in \mathbb{F}_p$ uniformly at random
    Lookup public key $A = p_i^{priv} \cdot G$ mod p for Device $p_i$
    Generate shared key: $y \cdot G$ mod p
    Encrypt message m by computing m + $(yA)_y$ mod q
    Device $p_i \leftarrow \{yG, m, + (yA)_y \bmod q, c_i, G, p, h_i\}$
end for

---

Then, if all participants of a group $\overline{\mathcal{P}} \subseteq \mathcal{P}$, where $|\overline{\mathcal{P}}| \geq t$, $|\mathcal{P}|$=n and t≤n, wish to decrypt an encryption (yG, m+$(yrG)_x$) of a message m $\epsilon$[1, p−1] using group private key r, threshold ElGamal decryption (e.g., per Ertaul) can be used as follows:

Each participant $p_i \epsilon \overline{\mathcal{P}}$ uses their secret key $r_i$=f(i) to compute a shadow:

$$w_i = \left( \prod_{\substack{j=1 \\ j \neq i}}^{t} \frac{-j}{i-j} \right) \cdot r_i \bmod q$$

Each participant then broadcasts their partial decryption $S_i$ defined as $S_i = w_i \cdot yG$ mod q.
Each participant locally computes the value:

$$S = \sum_{i=1}^{t} S_i \bmod q$$
$$= \left( \sum_{i=1}^{t} w_i \right) \cdot yG$$
$$= r \cdot yG$$

Finally, each participant may now locally recover the message m by computing $(m+(yrG)_y)$−S mod q=(m+ $(yrG)_y)$−$(ryG)_y$=m.

Likewise, a group $\overline{\mathcal{P}} \subseteq \mathcal{P}$ where $|\overline{\mathcal{P}}| \geq t$, $|\mathcal{P}|$=n and t≤n, can use a threshold signature scheme (e.g., Chen et al., "An efficient threshold group signature scheme," *IEEE Region 10 Conference TENCON*, volume B, pages 13-16 Vol. 2, 2004; Hua-qun et al., "Verifiable (t, n)Threshold Signature Scheme based on Elliptic Curve," *Wuhan University Journal of Natural Sciences*, volume 10, no. 1:165-168, 2005; Ibrahim et al., "A Robust Threshold Elliptic Curve Digital Signature providing a New Verifiable Secret Sharing Scheme," *IEEE 46th Midwest Symposium on Circuits and*

*Systems*, volume 1, pages 276-280 Vol. 1, 2003; Kim et al., "Threshold Signature Schemes for ElGamal Variants," *Computer Standards and Interfaces*, volume 33, no. 4:432-437, 2011; Shao, "Repairing Efficient Threshold Group Signature Scheme," *International Journal of Network Security*, 2008) to generate a signature representing all of $\mathcal{P}$ for message m as follows:

Each participant $p_i \in \mathcal{P}$ uses their secret key $r_i = f(i)$ and a random integer $y_i \in \mathbb{F}_q$ to calculate their individual signature $(R_i, S_i)$ for message m.

First, $R_i$ is computed from $y_i \cdot G \bmod p$ and publicized to all participants $p_i \in \mathcal{P}$.

Next, each participant $p_i$ calculates R, e, and $S_i$ as follows:

$$R = \sum_{i=1}^{t} R_i \bmod p$$

$$e = h(m, (R)_y \bmod q)$$

$$S_i = y_i + r_i e \left( \prod_{\substack{j=1 \\ j \neq i}}^{t} \frac{-j}{i-j} \right) \bmod q$$

$h(\cdot)$ or $H(\cdot)$ denotes a cryptographic hash function. Each participant broadcasts $S_i$ to an appointed secretary (for convenience, and who need not be trusted).

The secretary, having received all $(R_i, S_i)$ pairs, verifies the signature by computing:

$$R = \sum_{i=1}^{t} R_i \bmod p$$

$$e = h(m, (R)_y \bmod q)$$

$$R_i = S_i \cdot G + e \left( \prod_{\substack{j=1 \\ j \neq i}}^{t} \frac{-j}{i-j} \right) (-p_i^{pub}) \bmod p$$

If constructed properly, this equation will hold as:

$$R_i \stackrel{?}{=} S_i \cdot G + e \left( \prod_{\substack{j=1 \\ j \neq i}}^{t} \frac{-j}{i-j} \right) (-p_i^{pub}) \bmod p$$

$$= \left( y_i + r_i e \left( \prod_{\substack{j=1 \\ j \neq i}}^{t} \frac{-j}{i-j} \right) \right) \cdot G + e \left( \prod_{\substack{j=1 \\ j \neq i}}^{t} \frac{-j}{i-j} \right)(-r_i G)$$

$$= y_i G + e r_i G \left( \prod_{\substack{j=1 \\ j \neq i}}^{t} \frac{-j}{i-j} \right) + e(-r_i G) \left( \prod_{\substack{j=1 \\ j \neq i}}^{t} \frac{-j}{i-j} \right)$$

$$= y_i G + (e r_i G - e r_i G) \left( \prod_{\substack{j=1 \\ j \neq i}}^{t} \frac{-j}{i-j} \right)$$

$$= y_i G$$

$$:= R_i$$

If these hold, the secretary calculates:

$$S = \sum_{i=1}^{t} S_i \bmod q$$

which computes the group signature $((R)_y \bmod q, S)$ over m.

Upon receipt of (R, S), receiver $p_R$ checks its validity against the public key $\mathcal{P}^{pub}$ of the entire group of participants $p_i \in \mathcal{P}_{1 \leq i \leq n}$:

$$e \stackrel{?}{=} h(m, (S \cdot G + e \cdot -\mathcal{P}^{pub})_y \bmod q)$$

which holds on valid signatures because:

$$e \stackrel{?}{=} h(m, (S \cdot G + e \cdot -\mathcal{P}^{pub})_y \bmod q)$$

$$= h(m, ((y + re) \cdot G + e \cdot (-rG))_y)$$

$$= h(m, (yG + erG - erG)_y)$$

$$= h(m, (yG)_y)$$

$$= h(m, (R)_y \bmod q)$$

The participants of a group $\bar{\mathcal{P}} \subseteq \mathcal{P}$ where $|\bar{\mathcal{P}}| \geq t$, $|\mathcal{P}| = n$ and $t \leq n$ can also collaborate to demonstrate possession of a shared private key $\mathcal{P}^{priv} = r \in [1, q-1]$ using a threshold Zero Knowledge Proof of Knowledge (e.g., Sardar et al., "Zero Knowledge Proof in Secret Sharing Scheme Using Elliptic Curve Cryptography," *Global Trends in Computing and Communication Systems*, volume 269 of *Communications in Computer and Information Science*, pages 220-226, Springer, 2012) as follows:

The group public key is $\mathcal{P}^{pub} = rG$, where r is a shared secret and G is a group generator. The verifier $\mathcal{V}$ chooses an ephemeral nonce N and distributes this to all participants of $\mathcal{P}$.

Each participant $p_i \in \bar{\mathcal{P}}$ uses their secret share $r_i = f(i)$ and a random nonce integer $y_i$ to calculate their individual proof $(B_i, M_i)$ of the shared secret r.

First, $B_i$ is computed and publicized to all participants $p_i \in \bar{\mathcal{P}}$:

$B_i = y_i \cdot G \bmod p$

Each participant locally computes:

$$B = y \cdot G = \sum_{i=1}^{t} B_i \bmod p$$

Next, each participant $p_i$ calculates e, $M_i$ as follows:

$$e = h(G, B, \mathcal{P}^{pub}, N)$$

$$M_i = y_i + r_i e \left( \prod_{\substack{j=1 \\ j \neq i}}^{t} \frac{-j}{i-j} \right) \bmod q$$

Upon receipt of $(B_i, M_i)_{1 \leq i \leq t}$, the verifier V computes:

$$B = \sum_{i=1}^{t} B_i \mod p$$

$$M = \sum_{i=1}^{t} M_i \mod q$$

$$e = h(G, B, \mathcal{P}^{pub}, N)$$

Next, the verifier checks the proof's validity against the public key $\mathcal{P}^{pub} = rG$.

$$B \stackrel{?}{=} M \cdot G - e \cdot \mathcal{P}^{pub} \mod p$$
$$= (y + re) \cdot G - e \cdot (rG)$$
$$= yG + reG - reG$$
$$= yG$$

If $B = M \cdot G - e \cdot \mathcal{P}^{pub}$, the verifier $\mathcal{V}$ accepts the threshold zero knowledge proof as valid, and rejects the proof otherwise.

The process of signcrypting (e.g., Changgen et al., "Threshold Signcryption Scheme based on Elliptic Curve Cryptosystem and Verifiable Secret Sharing," *International Conference on Wireless Communications, Networking and Mobile Computing*, volume 2, pages 1182-1185, 2005; Zheng, "Digital Signcryption or How to Achieve Cost (Signature & Encryption)<<Cost(Signature)+Cost(Encryption)," *Advances in Cryptology, CRYPTO '97*, volume 1294 of *Lecture Notes in Computer Science*, pages 165-179, Springer, 1997; Zheng et al., "How to Construct Efficient Signcryption Schemes on Elliptic Curves," *Inf. Process. Lett.*, volume 68, no. 5:227-233, 1998) a message facilitates performing both signing and encrypting a message at a cost less than computing each separately. Given a message $m \in [1, q-1]$ and a receiver $p_R$ with public key $p_R^{pub}$, signcryption can be generated as follows:

Each $p_i \in \mathcal{P}$ selects a random $\kappa_i \in [1, q-1]$ and computes $Y_i = \kappa_i \cdot G$ and publicly broadcasts this to both a secretary (for convenience, and who need not be trusted) and the receiver $p_R$. Each $p_i \in \mathcal{P}$ also computes $Z_i = \kappa_i \cdot p_R^{pub}$ which is privately (for example, using ElGamal encryption) sent to $p_R$.

The secretary computes:

$$Z = \sum_{i=1}^{t} Z_i = \sum_{i=1}^{t} k_i \cdot p_R^{pub} = k \cdot p_R^{pub}$$

$$r = m \cdot (Z)_x \mod p$$

and broadcasts r (not to be confused with $r_i$, participant $p_i$'s share of $\mathcal{P}^{priv}$) to each signer $p_{1 \leq i \leq t}$.

Each signer $p_{1 \leq i \leq t}$ computes:

$$x_i = \prod_{\substack{j=1 \\ j \neq i}}^{t} \frac{-j}{i-j} \mod q$$

$$e_i = r_i \cdot x_i \mod q$$

$$s_i = k_i - e_i \cdot r \mod q$$

where $r_i = f(i)$ is $p_i$'s share of $\mathcal{P}^{priv}$. Each signer sends their partial signcryption $s_i$ to the secretary.

Upon receipt of a partial signcryption $s_i$, the secretary computes $Y'_i = r \cdot x_i \cdot p_i^{pub} + s_i \cdot G$ in order to verify the validity of the partial signcryption by checking $$Y_i \stackrel{?}{=} Y'_i.$$

Once receiving all partial signcryptions $s_i$ and checking their validity, the secretary combines them to compute:

$$s = \sum_{i=1}^{t} s_i \mod q$$

and (r, s) is the final signcryption sent to receiver $p_R$.

The receiving participant $p_R$, which has now received $\langle \{Y_i = \kappa_i \cdot G\}_{i \in [1 \ldots n]}, (r, s) \rangle$ computes:

$$Y = \sum_{i=1}^{t} Y_i = \sum_{i=1}^{t} (k_i \cdot G) = k \cdot G$$

$$Y' = r \cdot \mathcal{P}^{pub} + s \cdot G$$

$$Z' = p_R^{priv} \cdot Y'$$

The recipient $p_R$ then verifies that:

$$Y' \stackrel{?}{=} r \cdot \mathcal{P}^{pub} + s \cdot G$$
$$= r \cdot \mathcal{P}^{pub} + \sum_{i=1}^{t} s_i \cdot G$$
$$= r \cdot \mathcal{P}^{pub} + G \cdot \sum_{i=1}^{t} (k_i - e_i \cdot r)$$
$$= r \cdot \mathcal{P}^{pub} + \left( G \cdot \sum_{i=1}^{t} k_i \right) - \left( G \cdot \sum_{i=1}^{t} e_i \cdot r \right)$$
$$= r \cdot \mathcal{P}^{pub} + k \cdot G - r \cdot G \cdot \sum_{i=1}^{t} e_i$$
$$= r \cdot \mathcal{P}^{pub} + k \cdot G - r \cdot G \cdot \left( \sum_{i=1}^{t} r_i \cdot \left( \prod_{\substack{j=1 \\ j \neq i}}^{t} \frac{-j}{i-j} \right) \right)$$
$$= r \cdot \mathcal{P}^{pub} + k \cdot G - r \cdot G \cdot (f(0))$$
$$= r \cdot \mathcal{P}^{priv} \cdot G + k \cdot G - r \cdot G \cdot \mathcal{P}^{priv}$$
$$= k \cdot G = Y$$

If these hold, the group signature over m is valid.

The recipient $p_R$ can now recover the message m by computing:

$$r \cdot (Z')_x^{-1} = (m \cdot (Z)_x) \cdot (Z')_x^{-1}$$

-continued $$= (m \cdot (k \cdot p_R^{pub})_x) \cdot (p_R^{priv} \cdot Y')_x^{-1}$$

$$= (m \cdot (k \cdot (p_R^{priv} \cdot G))_x) \cdot (p_R^{priv} \cdot (k \cdot G))_x^{-1}$$

$$= m$$

With this, the recipient $p_R$ has both verified the group's signature over message m, as well as decrypted m.

Distributed Key Generation

Standard threshold cryptographic operations (e.g., those discussed above) traditionally require the presence of a trusted dealer $\mathcal{D}$ to define a generating polynomial f(•), select a secret r, and distribute shares of r to all participants $p_i \in \mathcal{P}$. Distributed key generation protocols (e.g., Ibrahim; Pedersen, "A Threshold Cryptosystem without a Trusted Party," *Advances in Cryptology, EUROCRYPT* 91, volume 547 of *Lecture Notes in Computer Science*, pages 522-526, Springer, 1991; Tang, "ECDKG: A Distributed Key Generation Protocol Based on Elliptic Curve Discrete Logarithm," Technical Report 04-838, Department of Computer Science, University of Southern California, 2004) remove the necessity of a trusted dealer, and allow a set of participants $\mathcal{P}$ to generate shares of a secret where no one knows the shared secret r. This can be accomplished in the present context as follows:

- Each participant $p_i \in \mathcal{P}$ defines a random polynomial $f_i(\bullet)$ of degree t−1, where t is the threshold. The temporary private value of participant $p_i$ is $c_0^{(i)}$, the free coefficient of $f_i(\bullet)$.
- Each participant $p_i \in \mathcal{P}$ privately sends $f_i(j)$ to participant $p_j$, $\forall j \in [1, \ldots, n]/i$.
- Participant $p_i$ broadcasts $\{c_k^{(i)} \cdot G \mod p\}_{k \in [0 \ldots, t-1]}$, commitments to the coefficients of $f_i(\bullet)$.
- Participant $p_i$ broadcasts $\{f_i(j) \cdot G \mod p\}_{j \in [0, \ldots, n]}$, the public shares for all participants.
- Each participant $p_{j \neq i} \in \mathcal{P}$ must now verify the shares they have received.
- First, each participant $p_{j \neq i}$ verifies that:

$$f_i(j) \cdot G \stackrel{?}{=} \sum_{k=0}^{t-1} j^k (c_k^{(i)} \cdot G) \mod p$$

$$= G \cdot \left( \sum_{k=0}^{t-1} j^k c_k^{(i)} \right)$$

$$= G \cdot f_i(j)$$

Similarly, each participant $p_{j \neq i} \in \mathcal{P}$ verifies that their share is consistent with other shares:

$$c_0^{(i)} \cdot G \stackrel{?}{=} \sum_{i=1}^{t} \left( \left( \prod_{\substack{j=1 \\ j \neq i}}^{t} \frac{-j}{i-j} \right) f_i(j) \cdot G \right) \mod p$$

$$= G \cdot \sum_{i=1}^{t} \left( \left( \prod_{\substack{j=1 \\ j \neq i}}^{t} \frac{-j}{i-j} \right) f_i(j) \right)$$

$$= G \cdot c_0^{(i)}$$

If these two verifications succeed, each participant $p_i \in \mathcal{P}$ computes its share of the master asymmetric private key r:

$$r_i = \sum_{j=1}^{n} f_j(i) \mod q$$

Similarly, the master asymmetric public key for the group is computed as:

$$r \cdot G = \sum_{j=1}^{n} \sum_{i=1}^{n} (f_j(i) \cdot G) \mod p$$

The distributed key generation protocol is preferably secure against an adversary that attempts to bias the output distribution, as in the attack described by Gennaro et al. ("Secure Distributed Key Generation for Discrete-Log Based Cryptosystems," *Advances in Cryptology, EUROCRYPT* 99, volume 1592 of *Lecture Notes in Computer Science*, pages 295-310, Springer, 1999). (Gennaro et al. ("Secure Applications of Pedersen's Distributed Key Generation Protocol," *Topics in Cryptology, CT-RSA* 2003, volume 2612 of *Lecture Notes in Computer Science*, pages 373-390, Springer, 2003) later concluded that many threshold operations may be performed securely despite an adversary's ability to bias the output distribution). Similarly, threshold constructions are preferably secure against both static as well as adaptive malicious adversaries (Abe et al., "Adaptively Secure Feldman VSS and Applications to Universally-Composable Threshold Cryptography," *Advances in Cryptology, CRYPTO* 2004, volume 3152 of *Lecture Notes in Computer Science*, pages 317-334, Springer, 2004; Jarecki et al., "Adaptively Secure Threshold Cryptography: Introducing Concurrency, Removing Erasures," *Advances in Cryptology, EUROCRYPT* 2000, volume 1807 of *Lecture Notes in Computer Science*, pages 221-242, Springer, 2000; Libert et al., "Adaptively Secure Forward-Secure Non-interactive Threshold Cryptosystems," *Information Security and Cryptology*, volume 7537 of *Lecture Notes in Computer Science*, pages 1-21, Springer, 2012).

PUF-Enabled Threshold Cryptography

The core functionality of a PUF is extracting a unique mapping between the challenge (input) domain and the response (output) range. As the mapping from challenges to responses is unique for each PUF-enabled device, collecting a set of challenge-response pairs (CRPs) through a provisioning process allows the device to be verified in the future. Protocol 1 illustrates the naïve provisioning process that underlies many PUF-enabled protocols.

| Protocol 1: Challenge-Response Provisioning | |
|---|---|
| PUF Device D | Server s |
|  | ← challenge c ∈ $\{0, 1\}^{K_1}$ |
| $P(c) \mapsto r \in \{0, 1\}^{K_2}$ → | store(D, {c, r}) |

Authentication proceeds by issuing a challenge for which the response is known to the server, and verifying that the response is t-close to the expected response. However, this lightweight naïve protocol has many limitations. During enrollment, a large number of challenge-response pairs must be collected, as each pair can only be used once for authentication. If an adversary observed the response, it could masquerade as the device. Similarly, the challenge-response database is sensitive, as an adversary could apply machine learning to fully characterize the PUF mapping [Rührmair I]. These issues can be entirely eliminated by applying cryptographic constructs around the PUF functionality.

In the example of an embodiment employing elliptic curve cryptography, Algorithms 1 and 2 below can be used to allow a PUF-enabled device to locally store and retrieve a sensitive value without storing any sensitive information in non-volatile memory. Algorithm 1 illustrates the storing of a sensitive value $\mathcal{V}_i$ using a PUF, and Algorithm 2 illustrates the dynamic regeneration of $\mathcal{V}_i$. The challenge $c_i$ and helper data helper$_i$ can be public, as neither reveals anything about the sensitive value $\mathcal{V}_i$. While the present example uses encryption of $\mathcal{V}_i$ by exclusive- or, $\oplus$, $\mathcal{V}_i$ could also be used as a key to other encryption algorithms (e.g., AES) to enable storage and retrieval of arbitrarily sized values.

---
Algorithm 1 PUF-Store
---

Goal: Store value $\mathcal{V}_i$
for PUF Device d do
    Select finite field $\mathbb{F}_n$ of order n
    Select E, an elliptic curve over $\mathbb{F}_n$
    Find $G \in E/\mathbb{F}_n$, a group generator
    Select challenge $c_i \in \mathbb{F}_n$
    x = H($c_i$, E, G, n)
    O = PUF($\chi$)
    helper$_i$ = $P_i$ = O $\oplus$ ECC($\mathcal{V}_i$)
    Write $\{c_i$, helper$_i\}$ to non-volatile memory
end for ---
Algorithm 2 PUF-Retrieve
---

Goal: Retrieve value $V_i$
for PUF Device d do
    Read $\{c_i$, helper$_i\}$ from non-volatile memory
    x $\leftarrow$ H($c_i$, E, G, n)
    O' = PUF(x)
    $V_i \leftarrow$ D((ECC $\mathcal{V}_i$) $\oplus$ O) $\oplus$ O')
end for

---

Whenever O and O' are t-close, the error correcting code ECC can be passed to a decoding algorithm D which will recover the sensitive value $\mathcal{V}_i$.

Using Algorithm 3, a local device can perform an enrollment protocol using the PUF. This allows each PUF circuit to generate a local public key $\mathcal{P}_i^{pub}$, which is useful for bootstrapping more complex key setup algorithms (e.g., the distributed key generation protocol in Algorithm 4). When the key setup algorithm is performed internal to the device (rather than externally among a set of distinct devices), this bootstrap process may not be necessary.

---
Algorithm 3 Enrollment
--- for Device d do
    $c_i \in \mathbb{F}_p$, a group element
    x = H($c_i$, E, G, p, q)
    O = PUF(x)
    helper$_i$ = O $\in$ ECC($p_i^{priv}$ mod q)
    $p_i^{pub}$ = $A_i$ = $p_i^{priv} \cdot$ G mod p
    Store $\{p_i^{pub}, c_i$, helper$_i\}$
end for

---

In accordance with the invention, PUF-based cryptographic primitives are adapted to secret sharing to permit threshold cryptography founded on PUF or other root of trust. Using the example of an embodiment employing elliptic curve cryptography, distributed key generation is used to generate a number of shares (for example, two: $r_1$, $r_2$) of a master private key $\mathcal{P}^{priv}=(r_1+r_2)$ mod q), which itself is never generated or constructed. (It is also possible to work directly with a message (e.g., as described by Ertaul) rather than a private key). The protocol is summarized in Algorithm 4: PUF-DKG, where an exemplary implementation would choose (t, n) as (2, 2).

---
Algorithm 4 PUF-DKG
---

Goal: Generate shares of master private key $\mathcal{P}^{priv}$
for $1 \leq i \leq n$ do
    Select random polynomial $f_i(\cdot) = c_0^{(i)} + \ldots + c_{t-1}^{(i)}x^{t-1}$ mod q
    Compute $f_i(j)$, $\forall j \in [1, \ldots, n]/i$
    Store coefficient commitments $\{c_k^{(i)} \cdot G \text{ mod } p\}_{k \in [0, \ldots, t-1]}$
    Store share commitments $\{f_i(j) \cdot G \text{ mod } p\}_{j \in [0, \ldots, n]}$
    for $1 \leq i \leq n$ do
        Verify $$f_i(j) \cdot G \stackrel{?}{=} \sum_{k=0}^{t-1} j^k (c_k^{(i)} \cdot G) \text{ mod } p$$

Verify $$c_0^{(i)} \cdot G \stackrel{?}{=} \sum_{i=1}^{t} \left( \left( \prod_{\substack{j=1 \\ j \neq i}}^{t} \frac{-j}{i-j} \right) f_i(j) \cdot G \right) \text{ mod } p$$

end for
    Recover share $$r_i = \sum_{j=1}^{n} \left( \left( \prod_{\substack{j=1 \\ j \neq i}}^{t} \frac{-j}{i-j} \right) f_j(i) \right) \text{ mod } q$$

Recover public key $$\mathcal{P}^{pub} = r \cdot G = \sum_{j=1}^{n} \sum_{i=1}^{n} \left( \left( \left( \prod_{\substack{j=1 \\ j \neq i}}^{t} \frac{-j}{i-j} \right) f_j(i) \right) \cdot G \right) \text{ mod } p$$

end for

---

Using Algorithms 1 and 2 for storing and retrieving a sensitive value, and Algorithm 4 for performing the initial distributed key generation protocol, arbitrary PUF-enabled threshold cryptographic operations (e.g., decryption, digital signatures, zero knowledge proofs) can now be performed. Algorithm 5 describes how to evaluate an arbitrary threshold cryptographic operation $\mathcal{O}$ that requires as input a participant's share $r_i$. Note that the recovered share $r_i$ has already been multiplied by the Lagrange terms $$\left( \prod_{j=1, j \neq i}^{t} \frac{-j}{i-j} \right).$$

---
Algorithm 5 PUF-Threshold-OP
---

Goal: Perform threshold operation $\mathcal{O}$
Assume: PUF-DKG (Algorithm 4) has been executed by PUF Device d
for Server s do
    Issue Command $\mathcal{O}$ and Auxiliary Information Aux
end for
for PUF Device d do
    for each challenge $c_i$ (Challenge c = $c_0$||...||$c_n$) do
        Read challenge $c_i$ and helper data $h_i$
        Recover share $r_i \leftarrow$ PUF-Retrieve($c_i$, $h_i$)
        Perform threshold operation $\mathcal{O}(r_i$, Aux)
    end for ---
Algorithm 5 PUF-Threshold-OP
---

Combine threshold operations $\mathcal{O} \leftarrow$ Combine($\{ \mathcal{O}(r_i, \text{Aux}) \}_{0 \leq i \leq n}$)
    return Result $\mathcal{O}$
end for
for Server s do
    Process operation $\mathcal{O}$
end for

---

This enables any threshold cryptographic operation (e.g., decryption, digital signature generation, zero knowledge proofs) to be performed by a PUF-enabled participant without ever generating, reconstructing, or storing their private key. Further, from an external perspective (e.g., the server), the PUF-enabled device simply implements standard public key cryptographic protocols. That is, the server never issues a challenge or stores helper data, and its interaction with the device is indistinguishable from any standard public key cryptography device.

By internalizing the challenge-response functionality of the PUF, and utilizing Algorithms 1 and 2 to locally store and recover a value (e.g., a cryptographic key), arbitrary (e.g., symmetric or asymmetric) cryptographic operations can be performed without need for issuing or storing auxiliary (e.g., challenges or helper data) information. While one embodiment described herein advantageously strengthens the construction through both distributed key generation and threshold cryptography, neither is necessary to support arbitrary cryptographic operations through localized storage and retrieval of a value using a device's PUF functionality according to the present invention.

Figure 2:
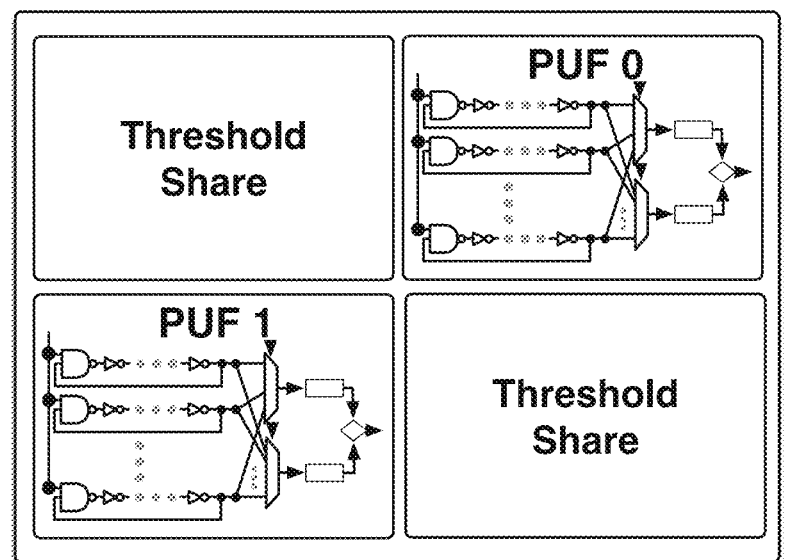
FIG. 2 is a functional diagram of a device having dual PUF circuits.

Although threshold cryptography typically considers distributing operations across physically-distinct nodes, in one embodiment of the present invention, threshold cryptography may be applied within a single device. As an example, a device may be equipped, e.g., with two PUF circuits (e.g., ring oscillator, arbiter, SRAM) and provided with the ability to execute at least two instructions at the same time (e.g., through multiple CPU cores). One embodiment of such a device may comprise a Xilinx Artix 7 field programmable gate array (FPGA) platform, equipped, e.g., with 215,000 logic cells, 13 Megabytes of block random access memory, and 700 digital signal processing (DSP) slices. In an embodiment employing elliptic curve cryptography, for example, the hardware mathematics engine may be instantiated in the on-board DSP slices, with the PUF construction positioned within the logic cells, and a logical processing core including an input and output to the PUF and constructed to control those and the device's external input and output and to perform algorithms (sending elliptic curve and other mathematical calculations to the math engine) such as those described above. The FPGA may have one or more PUF circuits implemented in separate areas of the FPGA fabric. Simultaneous execution may be accomplished by instantiating multiple software CPUs, e.g., a MicroBlaze processor. An embodiment of the present invention with only one PUF circuit would simply execute operations over each share sequentially, rather than querying the multiple PUF circuits in parallel. FIG. 2 illustrates a device equipped with two PUF circuits to enable local threshold cryptographic operations; the device may be, for example, an FPGA with a separate core containing each PUF. The potentially extractable output of a single PUF may then be obviated by constructing a local (2, 2) threshold system with each of the parts $p_i$ acting as a distinct participant. For example, each part may select a random challenge, run the enrollment algorithm (Algorithm 3) to generate an asymmetric key pair $\langle p_i^{pub} = p_i^{priv} \cdot G, p_i^{priv} \rangle$ and locally store its public enrollment information and then together run the distributed key generation protocol (Algorithm 4) and perform all cryptographic operations over a private key that is never actually constructed. When threshold cryptography is applied within a single device, it may not be necessary to run the enrollment algorithm (Algorithm 3) to generate an asymmetric key pair as all computations are performed internal to the device.

Algorithm 6 describes how a dual-PUF device can compute cryptographic operations in a threshold manner by constructing a (2, 2) threshold sharing within the device using distributed key generation. That is, the two parts establish a private key known to neither part through distributed key generation and publicize the corresponding public key $\mathcal{P}^{pub}$. All operations targeted at the device are now performed in a threshold manner through internal collaboration (with each part retrieving its share $r_i$ and performing a local threshold operation, and the results are combined to complete a threshold operation $\mathcal{O}$, while the input/output behavior of the device remains unchanged to external systems.

---
Algorithm 6 Dual-PUF-Threshold-OP
---

Goal: Perform threshold operation $\mathcal{O}$ at time $\tau$
One-Time Setup Stage
for each PUF Core $p_i \in \mathcal{P}$ do
    Run Algorithm 3: Enrollment, Publicize $p_i^{pub}$
end for
Run (2, 2)-PUF-DKG, Publicize $\mathcal{P}^{pub}$
Evaluation Stage
for each PUF Core $p_i \in \mathcal{P}$ do
    Recover share $r_i^{(\tau)} \leftarrow$ PUF-Retrieve($c_i^{(\tau)}$, helper$_i^{(\tau)}$)
    $p_i(\mathcal{O}) \leftarrow \mathcal{O}(r_i^{(\tau)})$, PUF core local threshold share
end for
return $\mathcal{O} \leftarrow$ Combine($\{p_0(\mathcal{O}), p_1(\mathcal{O})\}$)

---

Thus, rather than being constrained to a mapping between a challenge issued to the device and its response (which to an extent may be a function of the challenge), a multi-PUF device $d_i$ can have a single static external identity, $p_i^{pub}$. The challenge-response functionality of each PUF core is used to maintain each share of the device's private identity, $p_i^{priv}$, which is never generated or constructed. This renders a side channel attack more difficult for a remote adversary, which now must observe and resolve multiple values simultaneously generated within the device. Each part retrieves its share $r_i^{(\tau)}$ and performs a local threshold operation, and the shares are combined to complete the operation $\mathcal{O}$.

Figure 7:
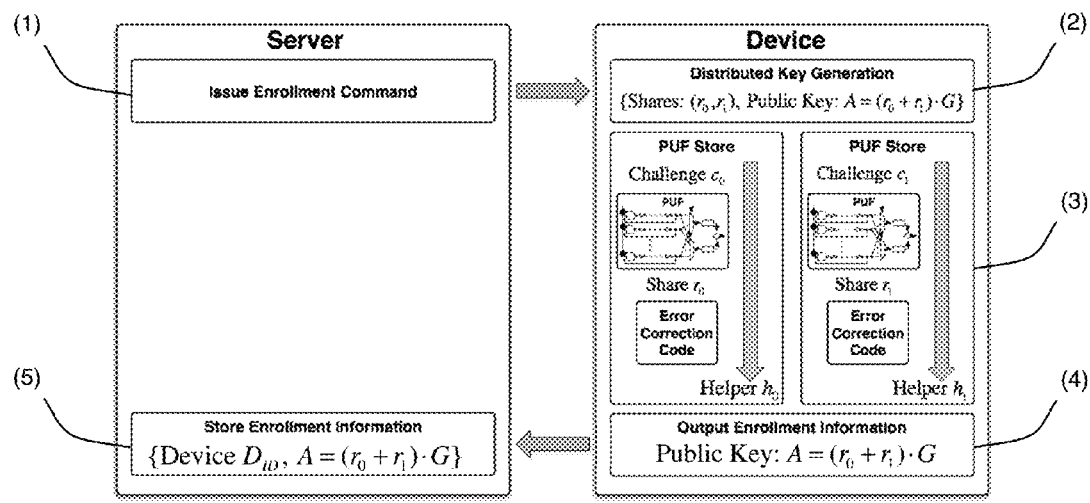
FIG. 7 is an operational flowchart of enrollment of a device like that of FIG. 2 in an embodiment of the invention.
Figure 8:
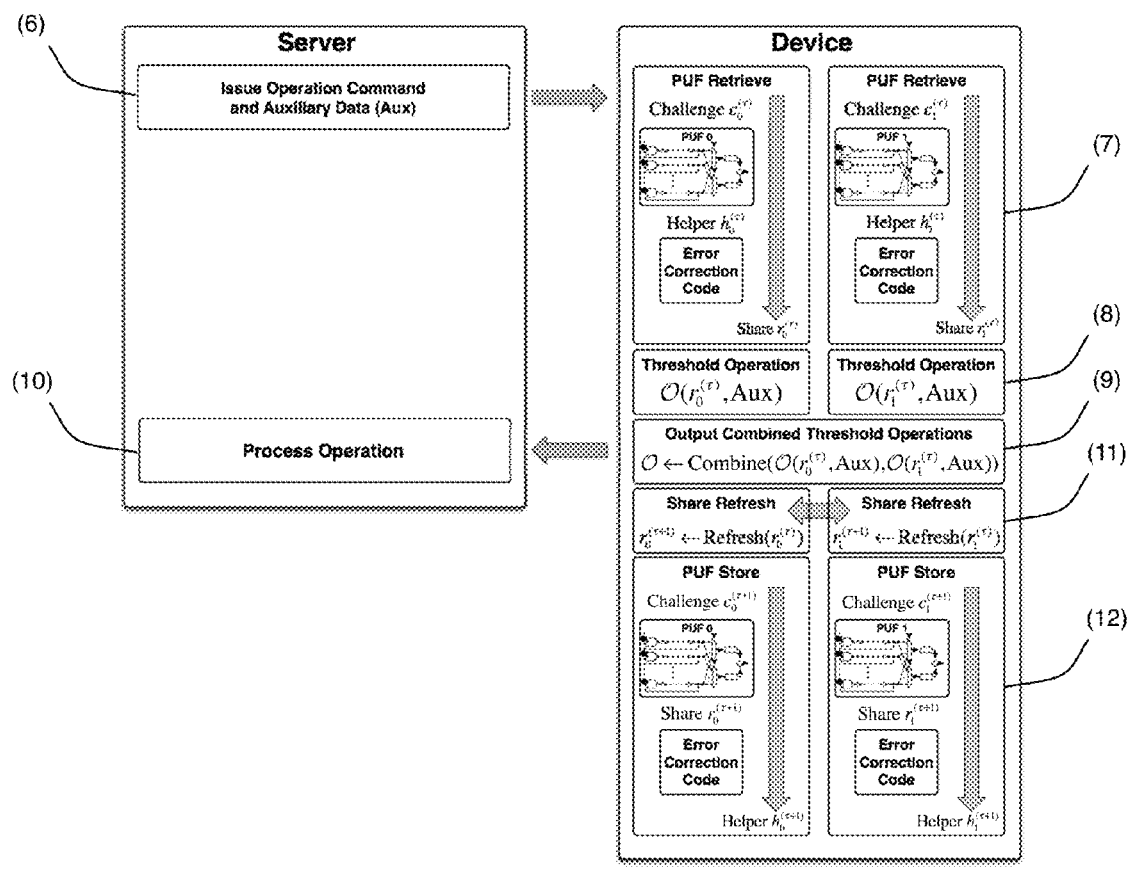
FIG. 8 is an operational flowchart of threshold cryptographic operations in a device like that of FIG. 2 in an embodiment of the invention.

Referring to FIG. 7 and FIG. 8, the core operations of an example embodiment employing elliptic curve cryptography, division of a key into two shares, and a (2, 2) threshold operation, are described.

Enrollment Command 1: During the initial enrollment process, the server and device agree on an elliptic curve E defined over a finite field $\mathbb{F}_p$ and base point G of order q, where p is $\lambda$ bits long. The server issues the enrollment command to the device.

Distributed Key Generation 2: The device performs a distributed key generation locally, creating shares ($r_0$, $r_1$) of the master private key (which is never generated or constructed) and its public key A=($r_0+r_1$) G. Rather than directly add the shares together (which would construct the private key r=$r_0+r_1$), the public key is formed by computing ($r_0 \cdot G$)+($r_1 \cdot G$).

Helper Data Generation 3: The device generates a random challenge $c=c_0\|c_1$, where $\|$ denotes concatenation and each $c_i$ block is $\lambda$ bits long. The device links each share $r_i$ to the output $O_i$ of the PUF on challenge $c_i$ through fuzzy extraction, which outputs a public helper $h_i$. As the PUF output $O_i$ is noisy, there is no guarantee that when queried on challenge $c_i$ in the future, the new output $O'_i$ will satisfy $O'_i = O_i$. However, it is assumed that $O_i$ and $O'_i$ will be t-close with respect to some distance metric (e.g. Hamming distance). Thus, an error correcting code may be applied to the PUF output such that at most t errors will still recover $O_i$. Error correction may be applied over each share $r_i$, and this value blinded with the output of the PUF $O_i$ on challenge $c_i$, so that each helper value $h_i = ECC(r_i) \oplus O_i$ reveals no information about share $r_i$. During recovery through fuzzy extraction, computing the exclusive- or of $ECC(r_i) \oplus O_i \oplus O'_i$ will return $r_i$ whenever $O_i$ and $O'_i$ are t-close. The device locally stores the challenge $c = c_0\|c_1$ and helper data $h = h_0\|h_1$, which will allow it to later recover the shares. Note that both the challenge and the helper data are public, and reveal nothing about the shares or the device's private key without invoking the PUF. This process is described by Algorithm 1.

Returned Public Key 4: The device returns its public enrollment information $\{A = (r_0 + r_1) \cdot G\}$ to the server.

Store Enrollment 5: The server stores the device's public enrollment information along with a (non-sensitive) identifier that is unique to the device (e.g., a serial number).

Threshold Operation Query 6: When the server wishes the device to perform a cryptographic operation (e.g., decryption, digital signature generation, zero knowledge proof authentication), it issues:

the appropriate command for the operation to be performed any auxiliary data Aux that is necessary for the operation (e.g., ciphertext to be decrypted, a message to be signed)

PUF Retrieval 7: The device reads the challenge $c = c_0\|c_1$ and helper data $h = h_0\|h_1$ from its local storage. The device then queries the PUF on each challenge block $c_i$, and combines the output $O'_i$ with the helper block $h_i$ and error correcting code to recover each share block $r_i$. This process is described by Algorithm 2.

Threshold Operation 8: The device performs a threshold operation $\mathcal{O}(r_i, Aux)$ over each share $r_i$. Algorithm 5 describes this process for any arbitrary threshold operation $\mathcal{O}$.

Combined Threshold Operations 9: The device combines the threshold operations to form the complete operation $\mathcal{O}$ and returns the result to the server.

Process Operation 10: The server finally performs any additional processing required for the operation (e.g., verifying a zero knowledge proof).

Share Refreshing

Various share refresh protocols (e.g., Frankel et al., "Optimal-Resilience Proactive Public-Key Cryptosystems," 38*th Annual Symposium on Foundations of Computer Science*, pages 384-393, 1997; Herzberg et al., "Proactive Public Key and Signature Systems," *Proceedings of the 4th ACM Conference on Computer and Communications Security*, CCS '97, pages 100-110, ACM, 1997; Herzberg et al., "Proactive Secret Sharing Or: How to Cope With Perpetual Leakage," *Advances in Cryptology, CRYPTO 95*, volume 963 of *Lecture Notes in Computer Science*, pages 339-352, Springer, 1995) allow each of a set of players $p_i \in \mathcal{P}$ to refresh their share $r_i^{(\tau)}$ of an original secret r at time period $\tau$ into a new share $r_i^{(\tau+1)}$ such that the resulting set of new shares $\{r_i^{(\tau+1)}\}_{i \in [1 \ldots n]}$ remains a sharing of the original secret. This protocol does not require reconstruction of the master secret r, so a mobile adversary would have to compromise t players in a fixed time period $\tau$ in order to recover the shared secret. Assuming a polynomial $f(\bullet)$ of degree (t-1) represents a shared secret $r = f(0)$ amongst n participants each having a share $r_i = f(i)$, and denoting encrypting for player $p_j$ as $ENC_j(\bullet)$ and decryption by $p_j$ as $DEC_j(\bullet)$, the set of players $p_i \in \mathcal{P}$ can refresh their sharing of r using such a protocol as follows:

Each player $p_i$ defines a new polynomial of degree (t-1) such that $\delta_i(0) = 0$:

$$\delta_i(\bullet) = \Delta_1^{(i)}x + \ldots + \Delta_m^{(i)}x^{t-1}$$

where the set $\{\Delta_m^{(i)}\}_{m \in [1 \ldots t-1]}$ is chosen randomly from $\mathbb{Z}_q$. Each player $p_i$ computes the following sets:

$$\{\epsilon_{im} = \Delta_m^{(i)} \cdot G\}_{m \in [1 \ldots t-1]}$$

$$\{u_{ij} = \delta_i(j)\}_{j \in [1 \ldots n]}$$

$$\{e_{ij} = ENC_j(u_{ij})\}_{j \in [1 \ldots n]}$$

and broadcasts a verifiable secret sharing $VSS_i^{(\tau)} = (i, \tau, \{\epsilon_{im}\}, \{e_{ij}\})$ and their signature $SIG_i(VSS_i^{(\tau)})$.

Each player $p_i$ recovers $u_{ji} = DEC_i(ENC_i(u_{ji}))$ and verifies $\forall j \neq i$:

$$u_{ji} \cdot G \stackrel{?}{=} \sum_{k=1}^{t-1} i^k \epsilon_{jk}$$

$$= \sum_{k=1}^{t-1} (i^k \Delta_k^{(j)} \cdot G)$$

$$= G \cdot \sum_{k=1}^{t-1} i^k \Delta_k^{(j)}$$

$$= G \cdot \delta_j(i)$$

$$= G \cdot u_{ji}$$

Finally, each player $p_i$ updates their share from time period ($\tau$) as:

$$r_i^{(\tau+1)} \leftarrow r_i^{(\tau)} + \left(\sum_{j=1}^{n} u_{ji} \mod q\right)$$

Thus, the refreshed set of shares $\{r_i^{(\tau+1)}\}_{i \in [1 \ldots n]}$ remains a sharing of the master private key $\mathcal{P}^{priv}$, and yet knowledge of t-1 or fewer shares from time period $\tau$ is useless in time period $\tau+1$.

As outlined in Algorithm 7, participants can update their share $r_i^{(\tau)}$ in time period $\tau$ to a new share $r_i^{(\tau+1)}$ in the next time period such that the set of shares $\{r_i\}_{i \in [1 \ldots n]}$ remains a sharing of the master private key $\mathcal{P}^{priv}$.

---

Algorithm 7 PUF-Share-Update

---

Goal: Generate new share $r_i^{(\tau+1)}$
for all Participants $p_i \in \mathcal{P}$ do
   Recover share $r_i^{(\tau)}$
     $r_i^{(\tau)} \leftarrow$ PUF-Retrieve($c_i^{(\tau)}$, helper$_i^{(\tau)}$)
   Select random polynomial of degree (t - 1) such that $\delta_i(0) = 0$:
     $\delta_i(\bullet) - \Delta_1^{(i)}x + \ldots + \Delta_m^{(i)}x^{t-1}$
   Compute -continued Algorithm 7 PUF-Share-Update $\{\epsilon_{im} = \Delta_m^{(i)} \cdot G\}_{m \in [1 \ldots t-1]}$
$\{u_{ij} = \delta_i(j)\}_{j \in [1 \ldots n]}$
$\{e_{ij} = ENC_j(u_{ij})\}_{j \in [1 \ldots n]}$
Broadcast $$VSS_i^{(\tau)} = \langle i, \tau, \{\epsilon_{im}\}, \{e_{ij}\} \rangle, SIG_i(VSS_i^{(\tau)})$$

Verify $\forall j \neq i$ $$DEC_i(ENC_i(u_{ji})) \cdot G \stackrel{?}{=} \sum_{k=1}^{t} i^k \epsilon_{jk}$$

Update share as:

$$r_i^{(\tau+1)} \leftarrow r_i^{(\tau)} + \left( \sum_{j=1}^{n} u_{ji} \bmod q \right)$$

Store $r_i^{(\tau+1)}$ and update PUF challenge:
  $\{c_i^{(\tau+1)}, helper_i^{(\tau+1)}\} \leftarrow$ PUF-Store($r_i^{(\tau+1)}$)
end for

---

The hardware device performs Algorithm 7 at Share Refresh 11 in FIG. 8 to generate new shares $r_i^{(\tau+1)}$ for the next time period $\tau+1$. At PUF Refresh and Store 12, the hardware device generates a new challenge $c_i^{(\tau+1)}$, which will refresh the challenge-helper pair for the next time period. The hardware device uses the new challenge to store the updated share $r_i^{(\tau+1)}$. Algorithms 5 and 6 are modified to refresh both the threshold shares as well as the challenge-helper pair, with Algorithms 8 and 9, respectively, reflecting the modifications.

Algorithm 8 PUF-Threshold-OP-Refreshing

Goal: Perform threshold operation $\mathcal{O}$
Assume: PUF-DKG (Algorithm 4) has been executed by PUF Device d
for Server s do
  Issue Command $\mathcal{O}$ and Auxiliary Information Aux
end for
for PUF Device d do
  for each challenge $c_i$ (Challenge $c = c_0 || \ldots ||c_n$) do
    Read challenge $c_i$ and helper data $h_i$
    Recover share $r_i \leftarrow$ PUF-Retrieve($c_i, h_i$)
    Perform threshold operation $\mathcal{O}(r_i, Aux)$
  end for
  Combine threshold operations $\mathcal{O} \leftarrow$ Combine($\{\mathcal{O}(r_i, Aux)\}_{0 \leq i \leq n}$)
  return Result $\mathcal{O}$
  for each share $r_i$ do
    Update share
      $r_i^{(\tau+1)} \leftarrow$ PUF-Share-Update($r_i^{(\tau)}$)
    Store $r_i^{(\tau+1)}$ and update PUF challenge:
      $\{c_i^{(\tau+1)}, helper_i^{(\tau+1)}\} \leftarrow$ PUF-Store($r_i^{(\tau+1)}$)
  end for
end for
for Server s do
  Process operation $\mathcal{O}$
end for Algorithm 9 Dual-PUF-Threshold-OP-Refreshing Goal: Perform threshold operation $\mathcal{O}$ at time $\tau$
One-Time Setup Stage
for each PUF Core $p_i \in \mathcal{P}$ do
  Run Algorithm 3: Enrollment, Publicize $p_i^{pub}$
end for
Run (2, 2)-PUF-DKG Protocol, Publicize $\mathcal{P}^{pub}$ -continued Algorithm 9 Dual-PUF-Threshold-OP-Refreshing Evaluation Stage
for each PUF Core $p_i \in \mathcal{P}$ do
  Recover share $r_i^{(\tau)} \leftarrow$ PUF-Retrieve($c_i^{(\tau)}$, helper$_i^{(\tau)}$)
  $p_i(\mathcal{O}) \leftarrow \mathcal{O}(r_i^{(\tau)})$, PUF core local threshold share
  Update share
    $r_i^{(\tau+1)} \leftarrow$ PUF-Share-Update($r_i^{(\tau)}$)
  Store $r_i^{(\tau+1)}$ and update PUF challenge:
    $\{c_i^{(\tau+1)}, helper_i^{(\tau+1)}\} \leftarrow$ PUF-Store($r_i^{(\tau+1)}$)
end for
return $\mathcal{O} \leftarrow$ Combine($\{p_0(\mathcal{O}), p_1(\mathcal{O})\}$)

---

Referring for example to a single-PUF embodiment as shown in FIG. 1, share updating may optionally be logically split into a preparation phase (Algorithm 10) and an application phase (Algorithm 11). During preparation, each participant generates its random polynomial and distributes its portion of the update to the other participants. After all participants have broadcast their portions of the share update, the preparation phase is complete. (Broadcasting may be omitted if preparation is applied within a single device such as an FPGA).

Algorithm 10 PUF-Share-Update-Preparation

Goal: Prepare update to construct share $r_i^{(\tau+1)}$
for all Participants $p_i \in \mathcal{P}$ do
  Select random polynomial of degree (t − 1) such that $\delta_i(0) = 0$:
    $\delta_i(\cdot) = \Delta_1^{(i)} x + \cdots + \Delta_m^{(i)} x^{t-1}$
  Compute
    $\{\epsilon_{im} = \Delta_m^{(i)} \cdot G\}_{m \in [1 \ldots t-1]}$
    $\{u_{ij} = \delta_i(j)\}_{j \in [1 \ldots n]}$
    $\{e_{ij} = ENC_j(u_{ij})\}_{j \in [1 \ldots n]}$
  Broadcast
    $VSS_i^{(\tau)} = \langle i, \tau, \{\epsilon_{im}\}, \{e_{ij}\} \rangle$,
      $SIG_i(VSS_i^{(\tau)})$
end for

---

Next, each participant verifies the update information received from other participants and applies the update to its share as set forth in Algorithm 11.

Algorithm 11 PUF-Share-Update-Application

Goal: Apply share update to construct $r_i^{(\tau+1)}$
for all Participants $p_i \in \mathcal{P}$ do
  Recover share $r_i^{(\tau)}$
    $r_i^{(\tau)} \leftarrow$ PUF-Retrieve($c_i^{(\tau)}$, helper$_i^{(\tau)}$)
  Verify $\forall j \neq i$ $$DEC_i(ENC_i(u_{ji})) \cdot G \stackrel{?}{=} \sum_{k=1}^{t} i^k \epsilon_{jk}$$

Update share as:

$$r_i^{(\tau+1)} \leftarrow r_i^{(\tau)} + \left( \sum_{j=1}^{n} u_{ji} \bmod q \right)$$

end for

---

As each threshold operation over a share can be performed independently of the other shares, the device need only recover one share at a time. This process is illustrated in Algorithm 12. Upon receiving a command $\mathcal{O}$ and its associated auxiliary information Aux, the device first performs Algorithm 10 to prepare for the share update. Next, the device iteratively performs threshold operations over each share. A share is recovered by reading a challenge-helper pair from non-volatile memory, and using the PUF to regenerate the corresponding share. After performing a threshold operation over the share, the share update is applied using Algorithm 11, which generates the updated share for new time period (τ+1). After computing the threshold operations over each share, the threshold operations are combined to form the result $\mathcal{O}$ which is returned to the server.

---

Algorithm 12 PUF-Threshold-OP-Staggered

---

Goal: Perform threshold operation $\mathcal{O}$
Assume: PUF-DKG (Algorithm 4) has been executed by PUF Device d
for Server s do
    Issue Command $\mathcal{O}$ and Auxiliary Information Aux
end for
for PUF Device d do
    for each share $r_i$ do
        PUF-Share-Update-Preparation
    end for
    for each challenge $c_i$ (Challenge c = $c_0 \| \ldots \| c_n$) do
        Read challenge $c_i$ and helper data $h_i$
        Recover share $r_i \leftarrow$ PUF-Retrieve($c_i$, $h_i$)
        Perform threshold operation $\mathcal{O}$ ($r_i$, Aux)
        Update share
            $r_i^{(\tau+1)} \leftarrow$ PUF-Share-Update-Application($r_i^{(\tau)}$)
        Store $r_i^{(\tau+1)}$ and update PUF challenge:
            $\{c_i^{(\tau+1)}, helper_i^{(\tau+1)}\} \leftarrow$ PUF-Store($r_i^{(\tau+1)}$)
    end for
    Combine threshold operations $\mathcal{O} \leftarrow$ Combine ($\{\mathcal{O}(r_i, \text{Aux})\}_{0 \leq i \leq n}$)
    return Result $\mathcal{O}$
end for
for Server s do
    Process operation $\mathcal{O}$
end for

---

In one embodiment, a (2, 2) threshold system is constructed internally to the device. Algorithm 13 illustrates an example of a single-PUF (2, 2) threshold construction of the more general Algorithm 12. The device has the share set $\{r_0, r_1\}$, and iteratively computes a threshold operation over each share to produce the set $\{p_0^{(\mathcal{O})}, p_1^{(\mathcal{O})}\}$. Once both threshold operations are complete and the shares have been updated and stored, the two threshold operations are combined into the final output $\mathcal{O}$.

---

Algorithm 13 Internal-PUF-Threshold-OP-Staggered

---

Goal: Perform threshold operation $\mathcal{O}$ at time τ
One-Time Setup Stage
for each Threshold Share $r_i$ do
    Run Algorithm 3: Enrollment, Publicize $p_i^{pub}$
end for
Run (2, 2)-PUF-DKG Protocol, Publicize $\mathcal{P}^{pub}$
Evaluation Stage
for each Threshold Share $r_i$ do
    PUF-Share-Update-Preparation
end for
for each Threshold Share $r_i$ do
    Recover share $r_i^{(\tau)} \leftarrow$ PUF-Retrieve($c_i^{(\tau)}$, helper$_i^{(\tau)}$)
    $p_i(\mathcal{O}) \leftarrow \mathcal{O}(r_i^{(\tau)})$, Local threshold operation
    Update share
        $r_i^{(\tau+1)} \leftarrow$ PUF-Share-Update-Application($r_i^{(\tau)}$)
    Store $r_i^{(\tau+1)}$ and update PUF challenge:
        $\{c_i^{(\tau+1)}, helper_i^{(\tau+1)}\} \leftarrow$ PUF-Store($r_i^{(\tau+1)}$)
end for
return $\mathcal{O} \leftarrow$ Combine ($\{p_0(\mathcal{O}), p_1(\mathcal{O})\}$)

---

Figure 9:
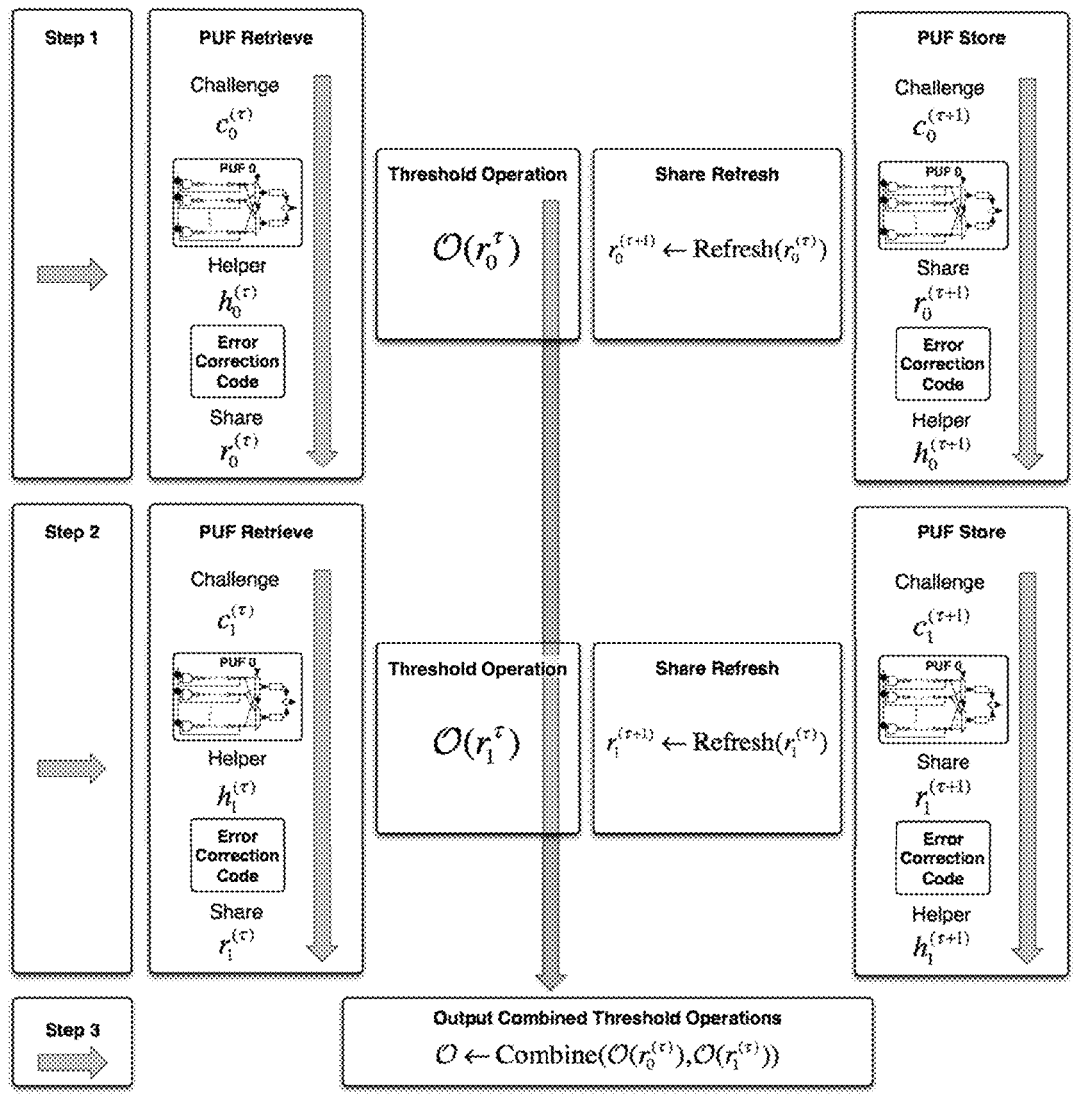
FIG. 9 is an operational flowchart of the staggered threshold operations.
Figure 10:
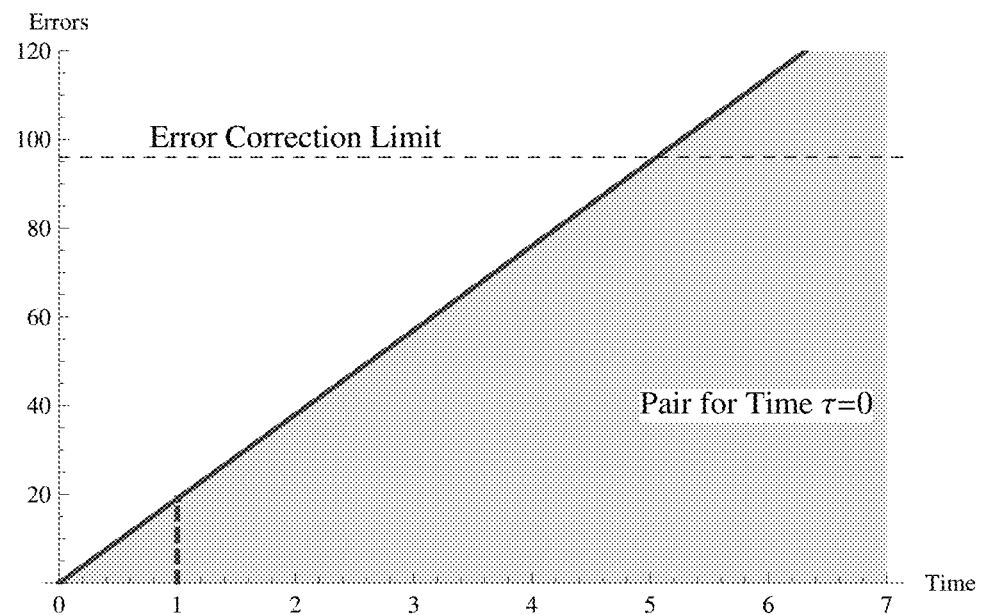
FIG. 10 is a graph illustrating errors over time in PUF output for a fixed challenge.

The flow of Algorithm 13, a specific single-PUF (2, 2) threshold construction of the more general Algorithm 12, is illustrated in FIG. 9. Prior to Step 1, the share update preparation (Algorithm 10) is performed. In Step 1, the first share $r_0^\tau$ is retrieved and its corresponding local threshold operation is performed. The share update (Algorithm 11) is then applied to $r_0^\tau$ to yield $r_0^{(\tau+1)}$ for the next time period. The updated share is then stored using a new random challenge $c_0^{(\tau+1)}$ which generates the corresponding helper data $h_0^{(\tau+1)}$ which will allow the updated share to be recovered using the PUF. The same process is followed in Step 2 for share $r_1^\tau$. Finally, the combined output $\mathcal{O}$ is constructed by combining the two local threshold operations that were performed over each share.

The device has a constant identity $\langle \mathcal{P}^{pub}, \mathcal{P}^{priv} \rangle$, yet all operations $\mathcal{P}$ that require $\mathcal{P}^{priv}$ are performed without ever reconstructing $\mathcal{P}^{priv}$ and with values that change after each operation is executed. As each part uses the PUF-Store and PUF-Retrieve algorithms to maintain its share, the (challenge, helper) pair is updated after each operation when PUF-Store is executed. Each share is refreshed for the new time period τ+1, and is stored by generating a new random challenge $c_i^{(\tau+1)}$ and setting the updated helper to helper$_i^{(\tau+1)} \leftarrow$ ECC($r_i^{(\tau+1)}$)$\oplus$PUF($c_i^{(\tau+1)}$). Staggering the threshold operations such that the share regeneration, threshold operation, and share storing occur consecutively (rather than concurrently), precludes the simultaneous recovery of more than one updated share. Any tampering while one share exists would (assuming tampering pushes PUF output beyond error correction limits) prevent recovery of another share, in which case the device cannot perform operations over its private key.

An adversary applying a side channel attack against such an embodiment therefore must extract t or more shares from a period of observation that cannot exceed the period of refreshment. In other words, the adversary must compromise t devices in a given time period τ since any shares from time period τ are useless in time period τ+1. The difficulty of a side channel attack thus can be increased by updating more frequently (even after each operation). (Increasing refresh frequency also may multiply the difficulty inherent in side channel attacks on multiple-PUF device embodiments in which a remote adversary must observe and resolve multiple PUF values simultaneously generated in the device).

Figure 11:
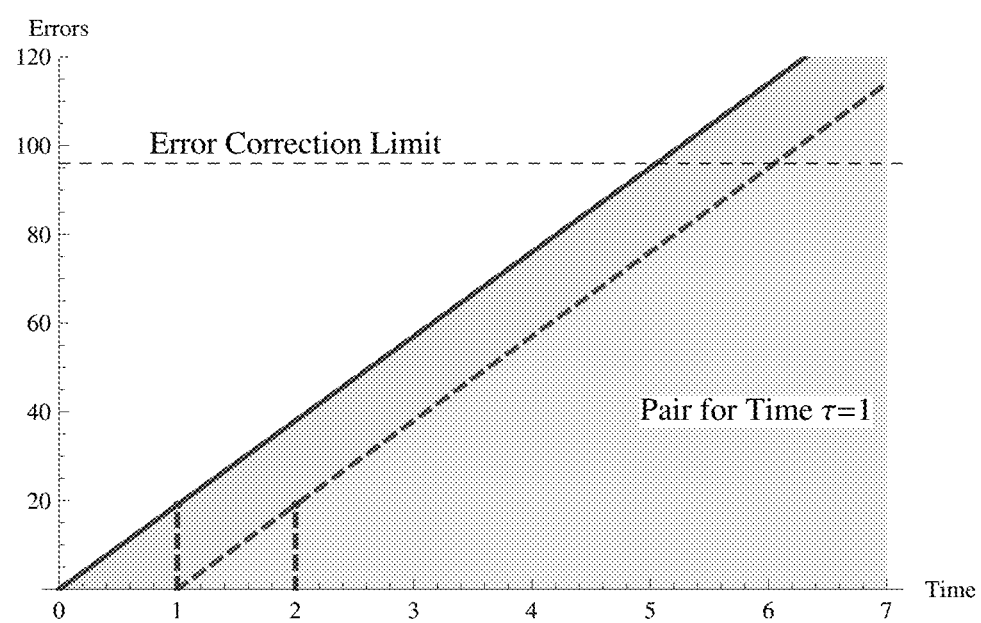
FIG. 11 is a graph illustrating errors over time in PUF output with an updated challenge-helper pair for $\tau=1$.

Also, whereas the longevity of systems using a fixed challenge/helper and response is directly limited to the hardware's increase in error rate due to aging, by continuously updating the pair in each time period, the error rate can be nominally reset to zero. That is, periodically refreshing the pair ($c_i^{(\tau)}$, helper$_i^{(\tau)}$) during each time period τ links the PUF output to the current state of the hardware, eliminating the hardware drift from previous time periods. In that regard, FIG. 11 illustrates the device recovering its share at time τ=1 using the original challenge-helper pair $\{c_i^{(0)}, helper_i^{(0)}\}$ from time τ=0 using Algorithm 2: PUF-Retrieve. The device then internally generates a new challenge-helper pair $\{c_i^{(1)}, helper_i^{(1)}\}$ for time period τ=1. The share is then stored by running Algorithm 1: PUF-Store using the new challenge-helper pair for τ=1. This links the updated challenge-helper pair to the current state of the hardware, which eliminates the hardware aging that occurred during time period τ∈[0, 1). Thus, the expected number of bit errors in the PUF output at time τ=1 is zero despite the hardware continuing to age according to rate ρ.

Figure 12:
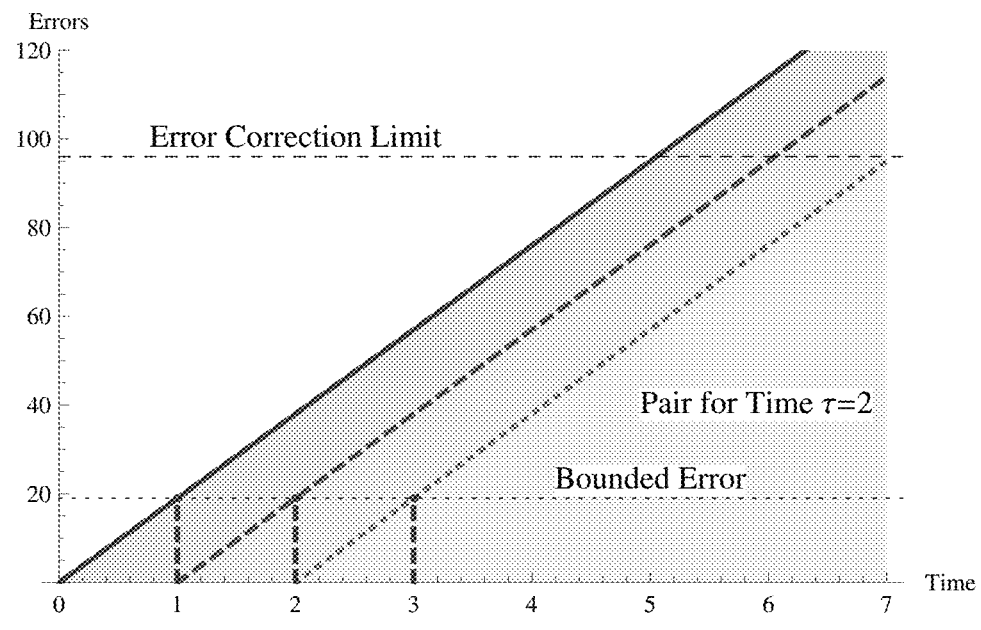
FIG. 12 is a graph illustrating errors over time in PUF output, with pair refreshing establishing a bounded PUF error rate.

As can be seen in FIG. 12, by repeating this process of periodically updating the internal challenge-helper pair of each PUF core, the maximum PUF output error can be bounded and made arbitrarily small by adjusting the refresh cycle period. Thus, a gradual shift in the PUF mapping is inconsequential. So long as the hardware has not fatally aged during the time between, the shift will be continuously factored into the stored challenge and helper data.

Dynamic Membership

The dynamic nature of shares in this construct also permits an embodiment in which the number of participants n participating in a group can be varied dynamically so that participants may join or leave the set of participants in the (t, n) threshold system. In this case, up to n-t participants can be removed from the set $\mathcal{P}$ simply by leaving them out of the next share refresh protocol. To add a participant $p_j$ to the set of participants, each current participant $p_i$ generates an extra share $u_{ij}$ from their share update polynomial $\delta_i(\bullet)$.

In some embodiments employing dynamic membership (in a (t, n) threshold system) and multi-PUF device(s), the device(s) may be configured to perform a local self-test to ensure it is not nearing the point where it can no longer recover its shares due to hardware aging. A secondary threshold, $\bar{t}<t$ (the maximum number of errors that may be corrected by error correction), may be set for the device such that when $\bar{t}$ errors are observed in the PUF output a transition protocol is initiated. The transition protocol can transfer the ability of a device $d_i$ to perform operations over its private key $p_i^{priv}$ to a different device $d_{j\neq i}$ without recovering $p_i^{priv}$. In the example of a dual-PUF device, when device $d_i$ detects critical hardware aging (e.g., when the PUF errors exceed secondary threshold $\bar{t}$), it runs the share refreshing protocol and increases n: 2→4. Device $d_i$ now possesses the set of shares $\{r_i\}_{1\leq i\leq 4}$, and privately sends $ENC_j\{r_i\}_{3\leq i\leq 4}$ to $d_j$ after verifying that $d_j$ is valid (e.g., verify the signature from a trusted source on $d_j$'s enrollment token and have $d_j$ perform a zero knowledge proof). Once $d_j$ has received the set $\{r_i\}_{3\leq i\leq 4}$, both $d_i$ and $d_j$ may act as $d_i$, and in the event of a hardware failure of $d_i$, it can be easily replaced by $d_j$.

The internal self-test procedure may be easily extended to the setting where multiple PUF-enabled devices are used as part of a larger system (e.g., a processing center as discussed below). When one PUF-enabled device fails to recover its share, it can be replaced with a new device. The remaining and correctly functioning PUF-enabled devices run the share update algorithm and increase n by sending the new device shares as well. This allows systems composed of multiple PUF-enabled devices to continue acting as a single entity, as failing devices can be immediately replaced and provisioned with shares of the global (t, n) threshold system.

Threshold Symmetric Operations

In addition to asymmetric operations, symmetric cryptographic operations may also be performed in a threshold manner (e.g., Nikova et al., "Threshold Implementations Against Side-Channel Attacks and Glitches," *Information and Communications Security*, volume 4307 of *Lecture Notes in Computer Science*, pages 529-545, Springer Berlin Heidelberg, 2006; Moradi et al., "Pushing the Limits: A Very Compact and a Threshold Implementation of AES," *Advances in Cryptology—EUROCRYPT 2011*, volume 6632 of *Lecture Notes in Computer Science*, pages 69-88, Springer Berlin Heidelberg, 2011; Bilgin et al., "A More Efficient AES Threshold Implementation," Cryptology ePrint Archive, Report 2013/697, 2013). This enables all cryptographic operations, asymmetric and symmetric, to be performed over threshold shares rather than the private key. As with the refreshing process described for shares of an asymmetric private key, the shares of a symmetric key may also be refreshed.

Reconfigurable PUFs

In one embodiment, reconfigurable PUFs may also be used. (See, e.g., Majzoobi et al., "Techniques for Design and Implementation of Secure Reconfigurable PUFs," *ACM Transactions on Reconfigurable Technology Systems*, volume 2, no. 1:5:1-5:33, 2009; Kursawe et al., "Reconfigurable Physical Unclonable Functions—Enabling technology for tamper-resistant storage," *Hardware-Oriented Security and Trust, 2009. HOST '09. IEEE International Workshop on*, pages 22-29, 2009; Katzenbeisser et al., "Recyclable PUFs: logically reconfigurable PUFs," *Journal of Cryptographic Engineering*, volume 1, no. 3:177-186, 2011; Eichhorn et al., "Logically Reconfigurable PUFs: Memory-based Secure Key Storage," *Proceedings of the Sixth ACM Workshop on Scalable Trusted Computing*, STC '11, pages 59-64, ACM, 2011) A reconfigurable PUF can alter its parameters such that a new PUF mapping is generated. This reconfiguration may be reversible, or irreversible and permanent.

As one example, the device can be provided with two reconfigurable PUF circuits (e.g., PUF-A, PUF-B) having a non-reversible reconfiguration process, and a 2-2 threshold sharing employed. After each share is recovered using PUF-A and refreshed, it is translated into a challenge-helper pair for storage using PUF-B. Once both refreshed shares have been stored using PUF-B, the reconfiguration process is applied to PUF-A, such that PUF-A now exhibits a new PUF mapping. The next time the shares are recovered, the same procedure is performed using PUF-B for recovery and PUF-A for commitment.

As another example, the device may be provided with a single reconfigurable PUF circuit having a reversible configuration process, and a 2-2 threshold sharing employed. The PUF configuration is controlled by a parameter, which may be stored locally on the device. Using parameter a to recover one share, a new random parameter b is chosen, the PUF is reconfigured, and the refreshed share is translated into a challenge-helper pair for storage using the PUF configured with parameter b. The PUF is then reconfigured using parameter a to recover the second share, which is subsequently refreshed and translated into a challenge-helper pair for storage using the PUF configured with parameter b. Now, original PUF parameter a is deleted, and the next round will select a new random parameter c to replace parameter b.

Scalability

Figure 13:
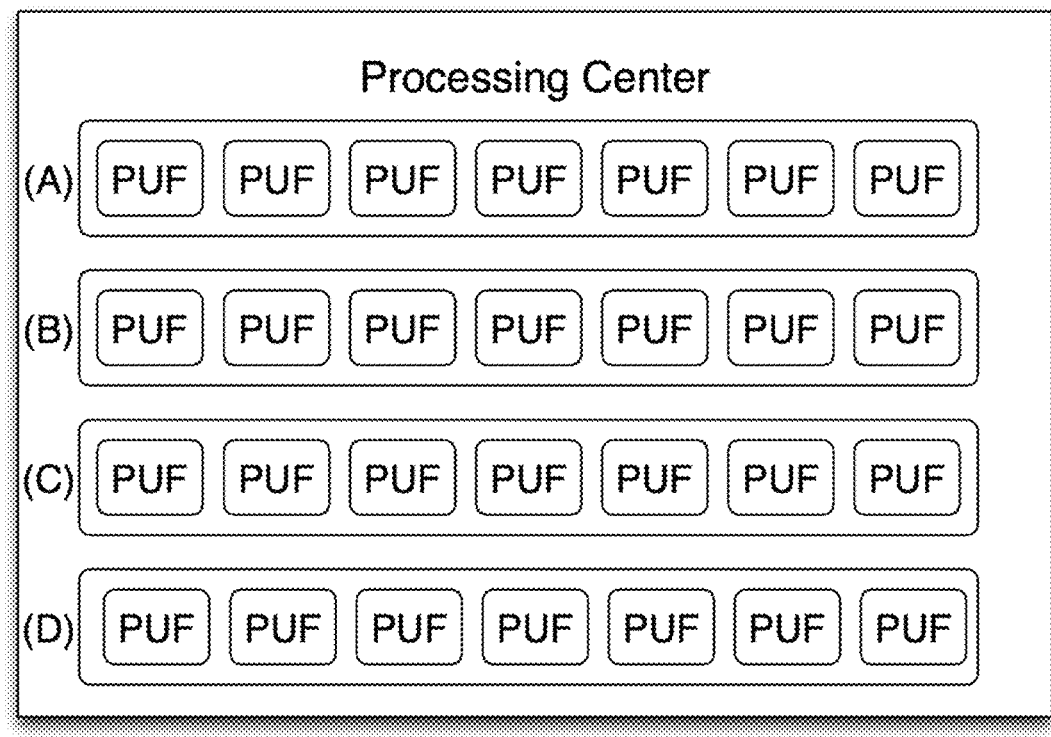
FIG. 13 is a diagram depicting a batch PUF processing center.

Standard PUF protocols are inherently linked to a specific hardware device (indeed, this is their goal), which can impose a constraint on the ability to readily scale a system to support an arbitrary processing load. FIG. 13 illustrates a processing center designed to scale to support an arbitrarily large processing load with PUFs employed to dynamically regenerate private information. By constructing a (t, n) sharing of a secret through distributed key generation, the private key for the system is never constructed or stored. However, any t PUFs can collaborate to perform cryptographic operations on behalf of the processing center. For example, if t=7, each row of PUFs can jointly perform a cryptographic operation on behalf of the processing center, and four requests (using rows A through D) can be completed simultaneously. Thus, scalable hardware-intrinsic identity solutions can be designed in which a group of hardware components with local hardware-intrinsic identity (e.g., equipped with a PUF) are able to act cooperatively to form a unique hardware-intrinsic identity for their group as a whole. This embodiment of the invention does not require the devices that compose the system to implement threshold cryptography locally. Rather, each device could run Algorithm 3 and publicize its local public key $p_i^{pub}$. The (t, n) sharing is then set up for the system, using each device's local public key for private communication.

Figure 14:
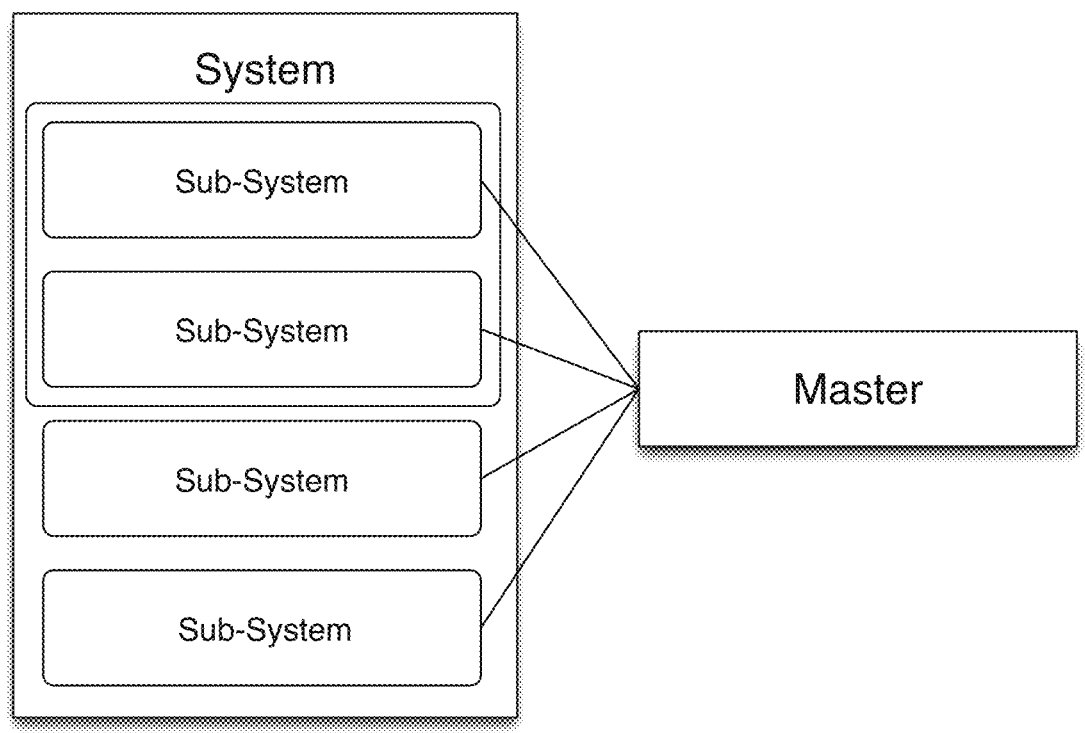
FIG. 14 is a diagram depicting joint identity from composite elements.

FIG. 14 illustrates a Master identity being generated from a set of component identities. An (n, n) threshold system could be constructed to require that all components are able to recover their shares in order to perform cryptographic operations using the Master identity. In another embodiment of the invention, a (t, n) threshold system could be constructed to require that all of the critical components and some of the non-critical components are able to recover their shares in order to perform cryptographic operations using the Master identity.

Performance

Performance tests were conducted on an embodiment having a single simulated 384-bit ring oscillator PUF (which did not require error correction), and a (2, 2) threshold system defined over NIST elliptic curve P-384. Operations over each share were performed sequentially, rather than simultaneously as may be done in a multiple PUF embodiment. The tests measured the total time necessary for storage and retrieval of values, and communication between the device and the server. The server was equipped with an 8-core 3.1 GHz processor and 16 GB of RAM, and the device-side algorithms implemented on a Xilinx Artix 7 FPGA running at 100 MHz over a 115200 baud connection, where all operations were performed on the NIST P-384 curve. Table 1 reports the average time per protocol over 1000 trials.

TABLE 1

Performance Results

| Protocol | Average Runtime | St. Dev. |
| --- | --- | --- |
| Enrollment | 0.011 seconds | 0.0027 |
| Authentication | 0.352 seconds | 0.0002 |
| ElGamal Encryption | 0.342 seconds | 0.0014 |
| ElGamal Signature | 0.352 seconds | 0.0002 |

What is claimed is:

1. An authenticatable device for use with an authentication system for processing arbitrary cryptographic operations on auxiliary data communicated to the device, comprising:

one or more physical unclonable function ('PUF') devices internal to the authenticatable device; and at least one processor internal to the authenticable device and operatively connected to the one or more PUF devices, wherein the at least one processor is configured to:

issue a first challenge to a first PUF device of the one or more PUF devices and receive a first output value from the first PUF device in response to issuing the first challenge;

recover, internal to the authenticatable device, a first share of a private key or secret encoded with the one or more PUFs, wherein the first share is mapped to the first output value;

perform a first threshold cryptographic operation with the first share and the auxiliary data;

issue a second challenge to the first PUF device or a second PUF device of the one or more PUF devices having a mapping to a second share and receive a second output value mapped to the second share in response to issuing the second challenge;

recover, internal to the authenticatable device, a second share of the private key or secret, encoded with the one or more PUFs, the second share different from the first share and mapped to the second output value;

perform a second threshold cryptographic operation with the second share and the auxiliary data; and enable processing of the arbitrary cryptographic operation with a combined output of at least the first and second threshold cryptographic operations.

2. The authenticatable device of claim 1, wherein the authenticatable device comprises more than one PUF device internal to the authenticatable device.

3. The authenticatable device of claim 2, wherein the at least one processor comprises more than one logical core.

4. The authenticatable device of claim 1, wherein the at least one processor is further configured to perform a share refresh procedure to refresh shares of the private key or secret.

5. The authenticatable device of claim 4, wherein the at least one processor is further configured to divide the share refresh procedure into a preparation phase and an application phase.

6. The authenticatable device of claim 5, wherein the at least one processor is further configured to perform a preparation phase that comprises generating share update information, and to perform an application phase that comprises applying the share update information to one or more shares.

7. The authenticatable device of claim 6, wherein the at least one processor is further configured to perform the preparation and application phases such that only one share refresh procedure is performed at once.

8. The authenticatable device of claim 7, wherein the authenticatable device includes a reconfigurable PUF device.

9. The authenticatable device of claim 1, wherein the at least one processor is further configured to combine multiple internal cryptographic operations to yield a cryptographic output.

10. The authenticatable device of claim 1, wherein the at least one processor is further configured to perform a zero knowledge proof authentication protocol.

11. The authenticatable device of claim 1, wherein the at least one processor is further configured to perform distributed key generation.

12. The authenticatable device of claim 1, wherein the at least one processor comprises more than one logical core, and the at least one processor is configured so that a first one of the more than one logical core can issue a challenge, recover a share, and perform a cryptographic operation in parallel with a second one of the more than one logical core.

13. The authenticatable device of claim 1, wherein the at least one processor is further configured to combine cryptographic operations on the first and the second shares without generating the private key or secret in memory.

14. The authenticatable device of claim 1, wherein the first share recovered is associated with the output received from the first PUF device based on at least a respective helper value.

15. The authenticatable device of claim 14, wherein the helper value is stored on the authenticatable device.

16. The authenticatable device of claim 1, wherein the at least one processor is configured to issue a different challenge for each challenge.

17. A computer implemented method of authenticating an authenticatable device for processing arbitrary cryptographic operations on auxiliary data communicated to the authenticatable device, the method comprising:

issuing, by at least one processor internal to the authenticatable device, a first challenge to a first PUF device operatively connected with the at least one processor;

receiving, by the at least one processor, a first output value from the first PUF device in response to issuing the first challenge;

recovering, internal to the authenticatable device by the at least one processor, a first share of a private key or secret encoded with the one or more PUFs, wherein the first share is mapped to the first output value;

performing a first threshold cryptographic operation with the first share;

issuing, by the at least one processor, a second challenge to the first PUF device or a second PUF device of the at least one PUF device having a mapping to a second share;

receiving, by the at least one processor, a second output value in response to issuing the second challenge;

recovering, internal to the authenticable device by the at least one processor, the second share of the private key or secret, encoded with the one or more PUFs, the second share different from the first share, and mapped to the second output value;

performing a second threshold cryptographic operation with the second share; and enabling processing of the arbitrary cryptographic operation with a combined output of at least the first and second threshold cryptographic operations.

18. The method according to claim 17, further comprising an act of enabling arbitrary operations to be performed without generating the private key or the secret in memory, wherein the act of enabling includes combining threshold cryptographic operations on the first and second shares.

19. The method according to claim 17, further comprising an act of refreshing, by the at least one processor, shares of the private key or secret.

20. At least one non-transitory computer-readable storage medium containing processor-executable instructions that, when executed, perform a method for processing arbitrary cryptographic operations on auxiliary data communicated to an authenticatable device comprising:

issuing a first challenge to a first PUF device operatively connected to at least one processor internal to the authenticatable device;

receiving a first output value from the first PUF device in response to issuing the first challenge;

recovering, internal to the authenticatable device, a first share of a private key or secret encoded with the one or more PUFs, wherein the first share is mapped to the first output value;

performing a first threshold cryptographic operation with the first share;

issuing a second challenge to the first PUF device or a second PUF device of the at least one PUF device having a mapping to a second share;

receiving a second output value in response to issuing the second challenge;

recovering, internal to the authenticatable device, a second share of the private key or secret, different from the first share, mapped to the second output value;

performing a second threshold cryptographic operation with the second share; and enabling processing of the arbitrary cryptographic operation with a combined output of at least the first and second threshold cryptographic operations.

* * * * *